US009611356B2

(12) United States Patent
Ieda et al.

(10) Patent No.: US 9,611,356 B2
(45) Date of Patent: Apr. 4, 2017

(54) COPOLYMER POLYAMIDE

(75) Inventors: Shinji Ieda, Tokyo (JP); Kazunori Terada, Tokyo (JP); Yu Nitto, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 240 days.

(21) Appl. No.: 13/990,937

(22) PCT Filed: Jan. 6, 2012

(86) PCT No.: PCT/JP2012/050183
§ 371 (c)(1),
(2), (4) Date: Jun. 18, 2013

(87) PCT Pub. No.: WO2012/093722
PCT Pub. Date: Jul. 12, 2012

(65) Prior Publication Data
US 2013/0261256 A1 Oct. 3, 2013

(30) Foreign Application Priority Data

Jan. 7, 2011 (JP) ................................ 2011-002061

(51) Int. Cl.
C08G 69/26 (2006.01)
C08G 69/36 (2006.01)
C08L 77/06 (2006.01)
C08G 69/08 (2006.01)

(52) U.S. Cl.
CPC ............. *C08G 69/26* (2013.01); *C08G 69/08* (2013.01); *C08G 69/265* (2013.01); *C08G 69/36* (2013.01); *C08L 77/06* (2013.01)

(58) Field of Classification Search
CPC .................................................... C08G 69/26
See application file for complete search history.

(56) References Cited

U.S. PATENT DOCUMENTS

| 4,471,088 | A | 9/1984 | Chiba et al. |
| 4,698,083 | A | 10/1987 | Shioura et al. |
| 4,759,784 | A | 7/1988 | Shono et al. |
| 5,378,800 | A | 1/1995 | Mok et al. |
| 5,780,534 | A | 7/1998 | Kleiner et al. |
| 5,965,689 | A | 10/1999 | Koning et al. |
| 6,121,388 | A | 9/2000 | Umetsu et al. |
| 6,133,406 | A | 10/2000 | Kosaka et al. |
| 6,172,178 | B1 | 1/2001 | Koning et al. |
| 6,297,345 | B1 | 10/2001 | Okushita et al. |
| 7,166,687 | B2 | 1/2007 | Venderbosch et al. |
| 8,357,450 | B2 * | 1/2013 | Miyoshi et al. ............. 428/220 |
| 2002/0055589 | A1 | 5/2002 | Matsuoka et al. |
| 2002/0077403 | A1 | 6/2002 | Gittinger et al. |
| 2003/0045621 | A1 | 3/2003 | Aramaki et al. |
| 2004/0049006 | A1 | 3/2004 | Aramaki et al. |
| 2004/0068090 | A1 | 4/2004 | Ogawa et al. |
| 2005/0113496 | A1 | 5/2005 | Saga |
| 2006/0142443 | A1 | 6/2006 | Aramaki et al. |
| 2006/0264542 | A1 | 11/2006 | Schneider |
| 2009/0069478 | A1 | 3/2009 | Seki et al. |
| 2009/0275682 | A1 | 11/2009 | Furukawa et al. |
| 2009/0281210 | A1 | 11/2009 | Aramaki |
| 2009/0302272 | A1 | 12/2009 | Sakata et al. |
| 2010/0098946 | A1 | 4/2010 | Tashiro et al. |
| 2010/0173139 | A1 | 7/2010 | Miyoshi et al. |
| 2012/0165466 | A1 | 6/2012 | Terada et al. |
| 2012/0178876 | A1 | 7/2012 | Sasaki et al. |

FOREIGN PATENT DOCUMENTS

| CA | 2065640 | 10/1992 |
| EP | 0 699 708 | 3/1996 |
| JP | 58-002327 | 1/1983 |
| JP | 64-002131 | 1/1989 |
| JP | 03-059019 | 3/1991 |
| JP | 04-013300 | 1/1992 |
| JP | 04-032775 | 2/1992 |
| JP | 5-17413 | 1/1993 |
| JP | 5-125184 | 5/1993 |

(Continued)

OTHER PUBLICATIONS

U.S. Office Action issued with respect to U.S. Appl. No. 13/393,604, mail date is Oct. 16, 2013.
Official Action issued with respect to U.S. Appl. No. 12/921,815, mail date is Mar. 14, 2011.
Official Action issued with respect to U.S. Appl. No. 12/921,815, mail date is Oct. 14, 2011.
Final Official Action issued with respect to U.S. Appl. No. 12/921,815, mail date is May 1, 2012.
US Office Action issued with respect to U.S. Appl. No. 13/393,604, mail date is Jun. 13, 2014.
US Office Action issued with respect to U.S. Appl. No. 13/393,299, mail date is Jun. 16, 2014.
European Search report issued with respect to application No. 12732338.4, mail date is Oct. 30, 2014.
European Search Report issued with respect to counterpart European Application No. 10815339.6, dated Nov. 29, 2012.
European Office Action issued with respect to counterpart European Application No. 10815339.6, dated Dec. 11, 2012.
U.S. Office Action issued with respect to related U.S. Appl. No. 13/393,299, dated Jun. 19, 2012.

(Continued)

*Primary Examiner* — Michael Pepitone
(74) *Attorney, Agent, or Firm* — Greenblum & Bernstein, P.L.C.

(57) ABSTRACT

An object of the present invention is to provide a copolymer polyamide which has excellent strength, high-temperature strength, low water absorbance, low blocking properties, releasability and plasticizing time stability, and a copolymer polyamide composition which has excellent vibration fatigue characteristics, surface appearance and continuous productivity. A copolymer polyamide of the present invention is obtained by polymerizing (a) at least one alicyclic dicarboxylic acid, (b) one diamine having 8 or more carbon atoms, and (c) at least one copolymer component selected from the group consisting of the following (c-1) to (c-3): a (c-1) dicarboxylic acid other than the alicyclic dicarboxylic acid; a (c-2) diamine having fewer carbon atoms than the (b) diamine; and a (c-3) lactam and/or aminocarboxylic acid, and the copolymer polyamide satisfies specific conditions.

29 Claims, No Drawings

(56) References Cited

FOREIGN PATENT DOCUMENTS

| | | |
|---|---|---|
| JP | 6-32980 | 2/1994 |
| JP | 6-503590 | 4/1994 |
| JP | 08-73720 | 3/1996 |
| JP | 8-503018 | 4/1996 |
| JP | 08-333511 | 12/1996 |
| JP | 9-12868 | 1/1997 |
| JP | 10-292113 | 11/1998 |
| JP | 11-512476 | 10/1999 |
| JP | 2000-336167 | 12/2000 |
| JP | 2001-514695 | 9/2001 |
| JP | 2002-097265 | 4/2002 |
| JP | 2002-309083 | 10/2002 |
| JP | 2003-2966 | 1/2003 |
| JP | 2003-119378 | 4/2003 |
| JP | 2003-138012 | 5/2003 |
| JP | 2003-292612 | 10/2003 |
| JP | 2003-292614 | 10/2003 |
| JP | 2004-75932 | 3/2004 |
| JP | 2004-149769 | 5/2004 |
| JP | 2004-211083 | 7/2004 |
| JP | 2004-075932 | 11/2004 |
| JP | 2006-273945 | 10/2006 |
| JP | 2006-522842 | 10/2006 |
| JP | 2007-291250 | 11/2007 |
| JP | 2008-38125 | 2/2008 |
| JP | 2008-221574 | 9/2008 |
| JP | 2010-111843 | 5/2010 |
| JP | 2011-225830 | 11/2011 |
| KR | 10-2002-0008152 | 1/2002 |
| WO | 92/08754 | 5/1992 |
| WO | 94/11418 | 5/1994 |
| WO | 97/11108 | 3/1997 |
| WO | 00/58248 | 10/2000 |
| WO | 02/48239 | 6/2002 |
| WO | 2006/112205 | 10/2006 |
| WO | 2008/149862 | 12/2008 |
| WO | WO 2008149862 A1 * | 12/2008 |
| WO | 2009/113590 | 9/2009 |
| WO | 2011/030742 | 3/2011 |

OTHER PUBLICATIONS

Japanese Office action that issued with respect to corresponding Japanese Patent Application No. 2009-097477, mail date is Apr. 3, 2012.
Japanese Office action that issued with respect to corresponding Japanese Patent Application No. 2009-097479, mail date is Apr. 11, 2012.
Search report from International Application No. PCT/JP2010/065408, mail date is Dec. 14, 2011.
International Preliminary Report on Patentability and Written Opinion for International Application No. PCT/JP2010/065408, mail date is Apr. 11, 2012.
Search report from International Application No. PCT/JP2010/065284, mail date is Nov. 2, 2010.
International Preliminary Report on Patentability and Written Opinion for International Application No. PCT/JP2010/065284, mail date is Apr. 11, 2012.
International Search Report for PCT/JP2009/054693, mailed May 12, 2009.
International Preliminary Report on Patentability issued with respect to PCT/JP2009/054693, mailed Nov. 11, 2010.
Korean Office action that issued with respect to corresponding Korean Patent Application No. 9-5-2012-010464251, mail date is Feb. 22, 2012.

* cited by examiner

COPOLYMER POLYAMIDE

CROSS REFERENCE TO RELATED APPLICATIONS

This application is a national stage application of PCT/JP2012/050183, filed Jan. 6, 2012, which claims priority to Japan Application No. 2011-002061, filed Jan. 7, 2011.

TECHNICAL FIELD

The present invention relates to a copolymer polyamide, and a copolymer polyamide composition.

BACKGROUND ART

Polyamides represented by polyamide 6 and polyamide 66 (hereinafter, sometimes referred to as "PA6" and "PA66" respectively) and the like have excellent molding processability, mechanical properties, or chemical resistance. Therefore, polyamides are widely used as a material for various parts, such as for automobiles, electric and electronic parts, industrial materials, and daily and household articles.

In the automobile industry, as an environmental measure, there is a need to lighten the weight of the automobile body by using a metal substitute in order to reduce exhaust gases. To respond to this need, polyamides are being increasingly used for exterior materials, interior materials and the like. Further, the level of the properties required for polyamide materials, such as heat resistance, strength, and surface appearance, is dramatically increasing. Among them, since the temperature in the engine room is also tending to increase, the need to increase the heat resistance of polyamide materials is growing stronger.

Further, in the electric and electronics industry, such as household appliances, there is a need for increased heat resistance for polyamide materials which are capable of withstanding the increased melting point of the solder required for lead-free surface-mount (SMT) solder.

Polyamides such as PA6 and PA66 are unable to satisfy these requirements in terms of heat resistance, since their melting point is low.

To resolve the above-described problems with conventional polyamides such as PA6 and PA66, a high-melting-point polyamide has been proposed. Specifically, a polyamide (hereinafter, sometimes referred to as "PA6T") formed from terephthalic acid and hexamethylenediamine has been proposed.

However, PA6T is a high-melting-point polyamide having a melting point of about 370° C. Therefore, even if a molded product is obtained by melt kneading, pyrolysis of the polyamide is severe, which makes it difficult to obtain a molded product having sufficient properties.

To resolve the above-described problem with PA6T, a high-melting-point semi-aromatic polyamide (hereinafter, sometimes referred to as "6T-based copolymer polyamide") and the like having terephthalic acid and a hexamethylenediamine as main components has been proposed. This high-melting-point semi-aromatic polyamide is obtained by copolymerizing an alicyclic polyamide, such as PA6 and PA66, or an amorphous aromatic polyamide (hereinafter, sometimes referred to as "PA6I") formed from isophthalic acid and hexamethylenediamine, and the like with PA6T; and has a melting point lowered to about 220 to 340° C.

As a 6T-based copolymer polyamide, Patent Document 1 describes an aromatic polyamide (hereinafter, sometimes referred to as "PA6T/2 MPDT") which is formed from an aromatic dicarboxylic acid and an aliphatic diamine, in which the aliphatic diamine is a mixture of hexamethylenediamine and 2-methylpentamethylenediamine.

Further, in contrast to an aromatic polyamide formed from an aromatic dicarboxylic acid and an aliphatic diamine, a high-melting-point aliphatic polyamide (hereinafter, sometimes referred to as "PA46") formed from adipic acid and tetramethylenediamine, and an alicyclic polyamide formed from an alicyclic dicarboxylic acid and an aliphatic diamine, and the like have been proposed.

Patent Documents 2 and 3 describe a semi-alicyclic polyamide (hereinafter, sometimes referred to as "PA6C copolymer polyamide") formed from an alicyclic polyamide (hereinafter, sometimes referred to as "PA6C") formed from 1,4-cyclohexanedicarboxylic acid and hexamethylenediamine, and another polyamide.

Patent Document 2 describes that electric and electronic parts formed from a semi-alicyclic polyamide blended with 1 to 40% of 1,4-cyclohexanedicarboxylic acid as a dicarboxylic acid unit have heat resistance which can resist a temperature under solder conditions. Patent Document 3 describes that automobile components made from a polyamide composition substantially consists of a unit derived from an aliphatic dicarboxylic acid and an aliphatic diamine has an excellent fluidity, toughness and the like.

In addition, Patent Document 4 describes that a polyamide formed from a dicarboxylic acid unit containing 1,4-cyclohexanedicarboxylic acid and a diamine unit containing 2-methyl-1,8-octanediamine has excellent light fastness, toughness, moldability, low weight, heat resistance and the like. Moreover, as a production method for such a polyamide, Patent Document 4 describes that a polyamide having a melting point of 311° C. is produced by reacting 1,4-cyclohexanedicarboxylic acid and 1,9-nonanediamine at 230° C. or less to produce a prepolymer, which is then subjected to solid phase polymerization at 230° C.

Further, Patent Document 5 describes that a polyamide using 1,4-cyclohexanedicarboxylic acid having a trans/cis ratio of from 50/50 to 97/3 as a raw material has excellent heat resistance, low water absorbance, and light fastness.

Patent Document 6 describes a polyamide formed by polymerizing 1,4-cyclohexanedicarboxylic acid and a diamine having a substituent branched from a main chain.

Patent Document 7 describes a polyamide formed by polymerizing 1,4-cyclohexanedicarboxylic acid, undecamethylenediamine and 1,6-diaminohexane. Patent Document 8 describes a polyamide formed by polymerizing 1,4-cyclohexanedicarboxylic acid, 1,12-diaminododecane and 1,6-diaminohexane.

LIST OF PRIOR ART DOCUMENTS

Patent Document

Patent Document 1: Japanese Patent Publication (Translation of PCT Application) No. 6-503590
Patent Document 2: Japanese Patent Publication (Translation of PCT Application) No. 11-512476
Patent Document 3: Japanese Patent Publication (Translation of PCT Application) No. 2001-514695
Patent Document 4: Japanese Patent Laid-Open No. 9-12868
Patent Document 5: WO 2002/048239
Patent Document 6: WO 2009/113590
Patent Document 7: Japanese Patent Publication No. 64-2131
Patent Document 8: WO 2008/149862

SUMMARY OF INVENTION

Problems to be Solved by Invention

Although 6T-based copolymer polyamides certainly have properties such as low water absorbance, high heat resistance, and high chemical resistance, fluidity is low, and moldability and the surface appearance of the molded product is insufficient. In addition, their toughness and light fastness is poor. Consequently, there is a need for improvement for applications which require a good molded product surface appearance and light fastness, such as an exterior component. Moreover, 6T-based copolymer polyamides have a large specific weight, so that there is a need for improvement in terms of reducing weight as well.

Although the PA6/2 MPDT described in Patent Document 1 can partially improve on the problems of conventional PA6T copolymers, the level of improvement in terms of fluidity, moldability, toughness, molded product surface appearance, and light fastness is insufficient.

Although PA46 has good heat resistance and moldability, PA46 suffers from the problems of high water absorbance. Further, the dimensional change and deterioration in mechanical properties due to water absorbance is very large. Thus, in some cases PA46 cannot satisfy the dimensional change requirement required for automobile applications.

The PA6C copolymer polyamide described in Patent Documents 2 and 3 also suffers from problems such as having a high water absorbance and insufficient fluidity.

For the polyamides described in Patent Documents 4 and 5 too, the improvement in terms of toughness, rigidity, and fluidity is insufficient.

The polyamide described in Patent Document 6 suffers from a problem of high water absorbance and a phenomenon of pellets blocking one another in handling the pellets, particularly in transporting them, and in some cases, there is a need for improvement in terms of low water absorbance, low blocking properties and releasability.

As for the polyamide described in Patent Document 7, there is a need for improvement in terms of low blocking properties and releasability in some cases.

As for the polyamide described in Patent Document 8, there is a need for improvement in terms of plasticizing time stability, vibration fatigue characteristics, surface appearance and continuous productivity in some cases.

Therefore, an object of the present invention is to provide a copolymer polyamide which has excellent strength, high-temperature strength, low water absorbance, low blocking properties, releasability and plasticizing time stability, and a copolymer polyamide composition which has excellent vibration fatigue characteristics, surface appearance and continuous productivity. Another object of the present invention is to provide a copolymer polyamide in which a ratio of units formed from biomass derived materials (a biomass plastic ratio) is so high that the environmental load can be reduced.

Means for Solving Problems

As a result of continued intensive investigations into resolving the above-described problems, the present inventors have discovered that a polyamide obtained by polymerizing, as the constituent components, a specific dicarboxylic acid, a specific diamine, and a specific copolymer component can resolve the above-described problems, thereby arriving at the present invention.

More specifically, the present invention is as follows.

[1]

A copolymer polyamide obtained by polymerizing:

(a) at least one alicyclic dicarboxylic acid;

(b) one diamine having 8 or more carbon atoms; and (c) at least one copolymer component selected from the group consisting of the following (c-1) to (c-3):

a (c-1) dicarboxylic acid other than the alicyclic dicarboxylic acid;

a (c-2) diamine having fewer carbon atoms than the (b) diamine; and a (c-3) lactam and/or aminocarboxylic acid, and the copolymer polyamide satisfying the following conditions (1) to (3):

(1) in differential scanning calorimetry based on JIS-K7121, a difference ($T_{pc-1}-T_g$) between a crystallization peak temperature $T_{pc-1}$ obtained in decreasing a temperature at 20° C./min and a glass transition temperature $T_g$ is 140° C. or more;

(2) a ratio between the number of carbon atoms and the number of amide groups (carbon atom number/amide group number) is 8 or more; and (3) in differential scanning calorimetry based on JIS-K7121, a difference ($T_{pm}-T_{pm-1}$) between a peak melting temperature $T_{pm}$ obtained in increasing a temperature at 20° C./min and a peak melting temperature $T_{pm-1}$ obtained in increasing the temperature again at 20° C./min is 30° C. or less.

[2]

The copolymer polyamide according to [1], wherein the (a) alicyclic dicarboxylic acid is 1,4-cyclohexanedicarboxylic acid.

[3]

The copolymer polyamide according to [1] or [2], wherein a trans isomer ratio of a portion derived from the (a) alicyclic dicarboxylic acid is 65 to 80 mol %.

[4]

The copolymer polyamide according to any one of [1] to [3], wherein a ratio of an amount of amino terminals to a total amount of amino terminals and carboxyl terminals {the amount of amino terminals/(the amount of amino terminals+ the amount of carboxyl terminals)} is 0.5 or more and less than 1.0.

[5]

The copolymer polyamide according to any one of [1] to [4], wherein the (b) one diamine having 8 or more carbon atoms is decamethylenediamine.

[6]

The copolymer polyamide according to any one of [1] to [5], wherein the (c-1) dicarboxylic acid other than the alicyclic dicarboxylic acid is an aliphatic dicarboxylic acid having 10 or more carbon atoms.

[7]

The copolymer polyamide according to any one of [1] to [6], wherein the (c-1) dicarboxylic acid other than the alicyclic dicarboxylic acid is sebacic acid and/or dodecanedioic acid.

[8]

The copolymer polyamide according to any one of [1] to [5], wherein the (c-1) dicarboxylic acid other than the alicyclic dicarboxylic acid is isophthalic acid.

[9]

The copolymer polyamide according to any one of [1] to [8], wherein the (c-2) diamine having fewer carbon atoms than the (b) diamine is an aliphatic diamine having 4 to 7 carbon atoms.

[10]

The copolymer polyamide according to any one of [1] to [9], wherein in differential scanning calorimetry based on JIS-K7121, a difference ($T_{pc-1}-T_{pc-2}$) between a crystallization peak temperature $T_{pc-1}$ obtained in decreasing a temperature at 20° C./min and a crystallization peak temperature $T_{pc-2}$ obtained in decreasing the temperature again at 50° C./min is 10° C. or less.

[11]

The copolymer polyamide according to any one of [1] to [10], wherein a blend amount of the (c) copolymer component is 7.5 mol % or more and 20.0 mol % or less based on 100 mol % of all constituent components of the copolymer polyamide.

[12]

The copolymer polyamide according to any one of [1] to [11], wherein the copolymer polyamide has a biomass plastic ratio of 25% or more.

[13]

A copolymer polyamide composition comprising:
the copolymer polyamide according to any one of [1] to [12]; and
at least one component selected from the group consisting of an inorganic filler, a nucleating agent, a lubricant, a stabilizer and a polymer other than the copolymer polyamide.

[14]

A molded product comprising the copolymer polyamide according to any one of [1] to [12] or the copolymer polyamide composition according to [13].

[15]

The molded product according to [14], wherein the molded product is used as an automobile component, an electronic component, a household electrical appliance component, an OA equipment component or a mobile equipment component.

[16]

A method for producing the copolymer polyamide according to any one of [1] to [12], comprising a step of polymerizing:
 (a) at least one alicyclic dicarboxylic acid;
 (b) one diamine having 8 or more carbon atoms; and
 (c) at least one copolymer component selected from the group consisting of the following (c-1) to (c-3):
  a (c-1) dicarboxylic acid other than the alicyclic dicarboxylic acid;
  a (c-2) diamine having fewer carbon atoms than the (b) diamine; and
  a (c-3) lactam and/or aminocarboxylic acid,
 wherein a trans isomer ratio of a portion derived from the (a) alicyclic dicarboxylic acid in the copolymer polyamide obtained in the polymerizing step is maintained at 65 to 80%.

[17]

A method for producing a copolymer polyamide composition comprising a step of melt kneading, with an extruder, raw material components including the copolymer polyamide according to any one of [1] to [12],
wherein a set temperature of the extruder is set to the peak melting temperature $T_{pm-1}$ according to [1] +30° C. or less.

Advantages of Invention

According to the present invention, a copolymer polyamide which has excellent strength, high-temperature strength, low water absorbance, low blocking properties, releasability and plasticizing time stability and a copolymer polyamide composition which has excellent vibration fatigue characteristics, surface appearance and continuous productivity can be provided. Furthermore, in the copolymer polyamide of the present invention, a ratio of units formed from biomass derived materials (a biomass plastic ratio) is so high that the environmental load can be reduced.

MODE FOR CARRYING OUT INVENTION

A mode (hereinafter referred to as "embodiment") for carrying out the present invention will now be described in more detail. However, the present invention is not limited to the following embodiment, and can be variously modified within the scope of the intent of the invention.

<<Copolymer Polyamide>>

The copolymer polyamide according to the present embodiment is a copolymer polyamide obtained by polymerizing the following (a), (b), and (c) and satisfying the following conditions (1) to (3):
 (a) at least one alicyclic dicarboxylic acid.
 (b) one diamine having 8 or more carbon atoms.
 (c) at least one specific copolymer component.
 (1) In differential scanning calorimetry based on JIS-K7121, a difference ($T_{pc-1}-T_g$) between a crystallization peak temperature $T_{pc-1}$ obtained in decreasing a temperature at 20° C./min and a glass transition temperature $T_g$ is 140° C. or more.
 (2) A ratio between the number of carbon atoms and the number of amide groups (carbon atom number/amide group number) is 8 or more.
 (3) In differential scanning calorimetry based on JIS-K7121, a difference ($T_{pm}-T_{pm-1}$) between a peak melting temperature $T_{pm}$ obtained in increasing the temperature at 20° C./min and a peak melting temperature $T_{pm-1}$ obtained in increasing the temperature again at 20° C./min is 30° C. or less.

In the present embodiment, "polyamide" means a polymer which has an amide (—NHCO—) bond in a main chain.

The components (a), (b) and (c) will now be described in detail.

[(a) Alicyclic Dicarboxylic Acid]

Examples of the (a) alicyclic dicarboxylic acid used in the present embodiment (hereinafter also referred to as "cycloaliphatic dicarboxylic acid") include alicyclic dicarboxylic acids having an alicyclic structure with 3 to 10 carbon atoms, and an alicyclic dicarboxylic acid having an alicyclic structure with 5 to 10 carbon atoms is preferable. Specific Examples of the (a) aliphatic dicarboxylic acid include 1,4-cyclohexanedicarboxylic acid, 1,3-cyclohexanedicarboxylic acid, and 1,3-cyclopentanedicarboxylic acid.

The (a) alicyclic dicarboxylic acid used in the present embodiment may optionally have a substituent.

Examples of the substituents include an alkyl group having 1 to 4 carbon atoms, such as a methyl group, an ethyl group, a n-propyl group, an isopropyl group, a n-butyl group, an isobutyl group, and a tert-butyl group.

From perspectives such as heat resistance, low water absorbance, strength, and rigidity, 1,4-cyclohexanedicarboxylic acid is preferred as the (a) alicyclic dicarboxylic acid used in the present embodiment.

As the (a) alicyclic dicarboxylic acid used in the present embodiment, one kind may be used, or two or more kinds may be used in combination.

Alicyclic dicarboxylic acids have trans and cis geometric isomers. The alicyclic dicarboxylic acid used as a raw material monomer may be either a trans or a cis isomer. The alicyclic dicarboxylic acid may also be used as a mixture of trans and cis isomers in various ratios.

Since alicyclic dicarboxylic acids isomerize in a fixed ratio at high temperatures, and the cis isomer has a higher water solubility than the trans isomer in an equivalent amount of salt with a diamine, in the alicyclic dicarboxylic acid used as the raw material monomer, a trans isomer/cis isomer ratio is, based on molar ratio, preferably 50/50 to 0/100, more preferably 40/60 to 10/90, and still more preferably 35/65 to 15/85.

The alicyclic dicarboxylic acid trans isomer/cis isomer ratio (molar ratio) can be determined by liquid chromatography (HPLC) or nuclear magnetic resonance spectroscopy (NMR). Herein, a trans isomer/cis isomer ratio (molar ratio) is determined by $^1$H-NMR.

[(b) Diamine Having 8 or More Carbon Atoms]

The (b) diamine having 8 or more carbon atoms used in the present embodiment is not limited as long as it is a diamine having 8 or more carbon atoms, and may be an unsubstituted straight-chain aliphatic diamine, a branched aliphatic diamine having a substituent of, for example, an alkyl group having 1 to 4 carbon atoms, such as a methyl group, an ethyl group, an n-propyl group, an isopropyl group, an n-butyl group, an isobutyl group or a tert-butyl group, an alicyclic diamine or an aromatic diamine. The carbon atom number of the (b) diamine used in the present embodiment is preferably 8 to 20, more preferably 8 to 15 and still more preferably 8 to 12.

Specific examples of the (b) diamine having 8 or more carbon atoms used in the present embodiment include octamethylenediamine, 2-methyloctamethylenediamine, nonamethylenediamine, decamethylenediamine, undecamethylenediamine, dodecamethylenediamine, tridecamethylenediamine, 2,2,4-trimethylhexamethylenediamine, 2,4,4-trimethylhexamethylenediamine, 2-methyloctamethylenediamine, 2,4-dimethyloctamethylenediamine, meta-xylylenediamine, ortho-xylylenediamine and para-xylylenediamine.

From the perspectives of heat resistance, low water absorbance, strength and rigidity, the (b) diamine having 8 or more carbon atoms used in the present embodiment is preferably octamethylenediamine, 2-methyloctamethylenediamine, nonamethylenediamine, decamethylenediamine, undecamethylenediamine or dodecamethylenediamine, more preferably 2-methyloctamethylenediamine, nonamethylenediamine, decamethylenediamine, undecamethylenediamine or dodecamethylenediamine, still more preferably decamethylenediamine or dodecamethylenediamine, and particularly preferably decamethylenediamine.

If two or more diamines having 8 or more carbon atoms are used in combination in the present embodiment, a diamine having the most carbon atoms is regarded as the component (b), with the other diamine(s) having 8 or more carbon atoms regarded as a component (c-2) described below.

[(c) Copolymer Component]

The (c) copolymer component used in the present embodiment is at least one selected from the group consisting of a (c-1) dicarboxylic acid other than the alicyclic dicarboxylic acid, a (c-2) diamine having fewer carbon atoms than the (b) diamine and a (c-3) lactam and/or aminocarboxylic acid.

The copolymer polyamide of the present embodiment includes, as a copolymer component, at least one selected from the aforementioned components (c-1) to (c-3), and hence has excellent strength, high-temperature strength, low water absorbance, low blocking properties, releasability and plasticizing time stability. Furthermore, a copolymer polyamide composition containing this copolymer polyamide has excellent vibration fatigue characteristics, surface appearance and continuous productivity.

When the copolymer polyamide of the present embodiment includes the component (c-1) as a copolymer component, it has particularly excellent low water absorbance and surface appearance. Alternatively, when the copolymer polyamide of the present embodiment includes the component (c-2) as a copolymer component, it has particularly excellent strength, high-temperature strength, low blocking properties and releasability. Further alternatively, when the copolymer polyamide of the present embodiment includes the component (c-3) as a copolymer component, it has particularly excellent high-temperature strength and releasability.

The (c) copolymer component to be combined with the (a) alicyclic dicarboxylic acid and the (b) diamine having 8 or more carbon atoms may be one or a combination of two or more. As for exemplary combinations, the components (c-1), (c-2) and (c-3) may be freely combined, and for example, two kinds of the component (c-1) may be combined, two kinds of the component (c-2) or (c-3) may be combined, or one kind of the component (c-1) and one kind of the component (c-2) may be combined.

In the present embodiment, the blend amount of the (c) copolymer component is preferably 5.0 mol % or more and 22.5 mol % or less, more preferably 7.5 mol % or more and 20.0 mol % or less, and still more preferably 10.0 mol % or more and 18.0 mol % or less, based on 100 mol % of the total amount of all constituent components of the copolymer polyamide. By setting the blend amount of the (c) copolymer component to fall in this range, a copolymer polyamide which has excellent strength, high-temperature strength, low water absorbance, low blocking properties, releasability and plasticizing time stability can be obtained. Furthermore, a copolymer polyamide composition containing this copolymer polyamide has excellent vibration fatigue characteristics, surface appearance and continuous productivity.

[(c-1) Dicarboxylic Acid Other than Alicyclic Dicarboxylic Acid]

Examples of the (c-1) dicarboxylic acid other than the alicyclic dicarboxylic acid used in the present embodiment include aliphatic dicarboxylic acids and aromatic dicarboxylic acids.

Examples of aliphatic dicarboxylic acids include straight-chain or branched aliphatic dicarboxylic acids having 3 to 20 carbon atoms, such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyl adipic acid, pimelic acid, suberic acid, azelaic acid, sebacic acid, dodecanedioic acid, tetradecanedioic acid, hexadecanedioic acid, octadecanedioic acid, eicosane diacid, and diglycolic acid.

Examples of aromatic dicarboxylic acids include aromatic dicarboxylic acids, which are unsubstituted or substituted with various substituents, having 8 to 20 carbon atoms, such as terephthalic acid, isophthalic acid, naphthalene dicarboxylic acid, 2-chloroterephthalic acid, 2-methylterephthalic acid, 5-methylisophthalic acid, and 5-sodium sulfoisophthalic acid.

Examples of the various substituents include an alkyl group having 1 to 4 carbon atoms, an aryl group having 6 to 10 carbon atoms, an arylalkyl group having 7 to 10 carbon atoms, a halogen group such as a chloro group or a bromo group, a silyl group having 1 to 6 carbon atoms, and a sulfonic acid group or salt thereof, such as a sodium salt.

As the (c-1) dicarboxylic acid other than the alicyclic dicarboxylic acid used in the present embodiment, from perspectives such as heat resistance, fluidity, toughness, low water absorbance, strength, and rigidity, an aliphatic dicarboxylic acid is preferred, and more preferred is an aliphatic dicarboxylic acid having 6 or more carbon atoms.

Of these, as the (c-1) dicarboxylic acid other than the alicyclic dicarboxylic acid, from perspectives such as heat resistance and low water absorbance, an aliphatic dicarboxylic acid having 10 or more carbon atoms is preferred.

Examples of aliphatic dicarboxylic acids having 10 or more carbon atoms include sebacic acid, dodecanedioic acid, tetradecanedioic acid, hexadecanedioic acid, octadecanedioic acid, and eicosanedioic acid.

Of these, as the (c-1) dicarboxylic acid other than the alicyclic dicarboxylic acid, from perspectives such as heat resistance, sebacic acid and/or dodecanedioic acid are preferred.

From the perspectives of heat resistance, fluidity, toughness, low water absorbance, strength, rigidity and the like, the (c-1) dicarboxylic acid other than the alicyclic dicarboxylic acid used in the present embodiment is preferably aromatic dicarboxylic acid and more preferably aromatic dicarboxylic acid having 8 carbon atoms.

Especially, from the perspectives of heat resistance, fluidity, surface appearance and the like, isophthalic acid is preferably used as the (c-1) dicarboxylic acid other than the alicyclic dicarboxylic acid.

To the extent that the object of the present embodiment is not harmed, the (c-1) dicarboxylic acid other than the alicyclic dicarboxylic acid may further include a trivalent or higher polyvalent carboxylic acid, such as trimellitic acid, trimesic acid, and pyromellitic acid.

As the polyvalent carboxylic acid, one kind may be used, or two or more kinds may be used in combination.

A ratio (mol %) of the (a) alicyclic dicarboxylic acid in the (a) alicyclic dicarboxylic acid and the (c-1) dicarboxylic acid other than the alicyclic dicarboxylic acid is not especially limited, and is preferably 50 to 100 mol %, more preferably 60 to 100 mol % and still more preferably 70 to 100 mol %. By setting the ratio of the (a) alicyclic dicarboxylic acid to 50 to 100 mol %, a copolymer polyamide which has excellent strength, high-temperature strength, low water absorbance, low blocking properties, releasability and plasticizing time stability can be obtained. Furthermore, a copolymer polyamide composition containing this copolymer polyamide has excellent vibration fatigue characteristics, surface appearance and continuous productivity.

In the present embodiment, the dicarboxylic acid is not limited to the compounds described above as dicarboxylic acids. The dicarboxylic acid may be a compound equivalent to those described above.

Examples of compounds equivalent to those described above are not especially limited, as long as such compound can have the same dicarboxylic acid structure as a dicarboxylic acid structure derived from the above-described dicarboxylic acids. Examples include anhydrides and halides of the dicarboxylic acid.

[(c-2) Diamine Having Fewer Carbon Atoms than the (b) Diamine]

Examples of the (c-2) diamine having fewer carbon atoms than the (b) diamine used in the present embodiment include aliphatic diamines, alicyclic diamines, and aromatic diamines.

Examples of aliphatic diamines include straight-chain aliphatic diamines, such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine, and branched aliphatic diamines, such as 2-methylpentamethylenediamine, 2,2,4-trimethylhexamethylenediamine, 2,4,4-trimethylhexamethylenediamine, 2-methyloctamethylenediamine, and 2,4-dimethyloctamethylenediamine.

Examples of alicyclic diamines (also referred to as cycloaliphatic diamines) include 1,4-cyclohexanediamine, 1,3-cyclohexanediamine, and 1,3-cyclopentanediamine.

Aromatic diamine is a diamine containing aromatic group. Examples of aromatic diamines include meta-xylylenediamine, ortho-xylylenediamine, and para-xylylenediamine.

From the perspectives of heat resistance, fluidity, toughness, low water absorbance, strength, rigidity and the like, the (c-2) diamine having fewer carbon atoms than the (b) diamine used in the present embodiment is preferably an aliphatic diamine or an alicyclic diamine, more preferably an aliphatic diamine having 4 to 13 carbon atoms, still more preferably an aliphatic diamine having 4 to 10 carbon atoms, and particularly preferably an aliphatic diamine having 4 to 7 carbon atoms.

To the extent that the object of the present embodiment is not harmed, the (c-2) diamine having fewer carbon atoms than the (b) diamine may further include a trivalent or higher polyvalent aliphatic amine, such as bishexamethylenetriamine.

As the polyvalent aliphatic amine, one kind may be used, or two or more kinds may be used in combination.

A ratio (mol %) of the (b) diamine having 8 or more carbon atoms in the (b) diamine having 8 or more carbon atoms and the (c-2) diamine having fewer carbon atoms than the (b) diamine is not especially limited, and is preferably 40 to 100 mol %, more preferably 50 to 100 mol %, and still more preferably 60 to 100 mol %. By setting the ratio of the (b) diamine having 8 or more carbon atoms to 40 to 100 mol %, a copolymer polyamide which has excellent strength, high-temperature strength, low water absorbance, low blocking properties, releasability and plasticizing time stability can be obtained. Furthermore, a copolymer polyamide composition containing this copolymer polyamide has excellent vibration fatigue characteristics, surface appearance and continuous productivity.

When a copolymer polyamide according to the present embodiment is obtained, the added amount of the dicarboxylic acid is preferably about the same molar amount as the added amount of the diamine. Considering escape out of the diamine reaction system in molar ratio during the polymerization reaction, based on a dicarboxylic acid molar amount of 1, the total diamine molar amount is preferably 0.90 to 1.20, more preferably 0.95 to 1.10, and still more preferably 0.98 to 1.05.

[(c-3) Lactam and/or Aminocarboxylic Acid]

The term "(c-3) lactam and/or aminocarboxylic acid" used in the present embodiment means a lactam and/or aminocarboxylic acid capable of polycondensation.

If the copolymer polyamide of the present embodiment is a copolymer polyamide obtained by polymerizing the (a) alicyclic dicarboxylic acid, the (b) diamine having 8 or more carbon atoms, and the (c-3) lactam and/or aminocarboxylic acid, the (c-3) lactam and/or aminocarboxylic acid is preferably a lactam and/or aminocarboxylic acid having 4 to 14 carbon atoms and more preferably a lactam and/or aminocarboxylic acid having 6 to 12 carbon atoms.

Examples of lactams include butyrolactam, pivalolactam, ε-caprolactam, caprylolactam, enantholactam, undecanonelactam, and laurolactam (dodecanolactam).

Of these, as the lactams, from the perspective of toughness, ε-caprolactam, undecanonelactam, laurolactam and the like are preferred, and ε-caprolactam, and laurolactam are more preferred.

Examples of the aminocarboxylic acid include ω-aminocarboxylic acid and α,ω-aminocarboxylic acid, which are compounds obtained by opening the ring of the above-described lactams.

As the aminocarboxylic acid, a straight-chain or branched saturated aliphatic carboxylic acid having 4 to 14 carbon atoms substituted at the a position with an amino group is preferred. Examples thereof include 6-aminocaproic acid, 11-aminoundecanoic acid, and 12-aminododecanoic acid. Further examples of the aminocarboxylic acid include para-aminomethylbenzoic acid.

Especially, from the perspectives of low water absorbance and toughness, the aminocarboxylic acid is more preferably 11-aminoundecanoic acid, 12-aminododecanoic acid or the like.

The added amount (mol %) of the (c-3) lactam and/or aminocarboxylic acid is not especially limited, and is preferably 0.5 mol % or more and 20 mol % or less and more preferably 2 mol % or more and 18 mol % or less, based on a total molar amount of the respective monomers of the (a) alicyclic dicarboxylic acid, the (b) diamine having 8 or more carbon atoms and the (c-3) lactam and/or aminocarboxylic acid. By setting the added amount of the (c-3) lactam and/or aminocarboxylic acid to 0.5 mol % or more and 20 mol % or less, a copolymer polyamide which has excellent heat resistance, low water absorbance, strength, releasability and the like can be obtained.

[End-Capping Agent]

In the present embodiment, apart from the aforementioned components (a) to (c), a known end-capping agent can be further added for molecular weight regulation in polymerizing the copolymer polyamide.

Examples of the end-capping agent include monocarboxylic acids, monoamines, acid anhydrides such as phthalic anhydride, monoisocyanates, monoacid halides, monoesters, and monoalcohols. From the perspective of thermal stability, monocarboxylic acids and monoamines are preferred.

As the end-capping agent, one kind may be used, or two or more kinds may be used in combination.

Examples of monocarboxylic acids which can be used as the end-capping agent are not especially limited, as long as the monocarboxylic acid is reactive with an amino group. Examples include: aliphatic monocarboxylic acids such as formic acid, acetic acid, propionic acid, butyric acid, valeric acid, caproic acid, caprylic acid, lauric acid, tridecyl acid, myristyl acid, pulmitic acid, stearic acid, pivalic acid, and isobutyric acid; alicyclic monocarboxylic acids such as cyclohexane carboxylic acid; and aromatic monocarboxylic acids such as benzoic acid, toluic acid, α-naphthalene carboxylic acid, β-naphthalene carboxylic acid, methylnaphthalene carboxylic acid, and phenylacetic acid.

As the monocarboxylic acid, one kind may be used, or two or more kinds may be used in combination.

Examples of monoamines which can be used as the end-capping agent are not especially limited, as long as the monoamine is reactive with a carboxyl group. Examples include: aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine.

As the monoamine, one kind may be used, or two or more kinds may be used in combination.

[Properties of Copolymer Polyamide]

In the copolymer polyamide according to the present embodiment, the alicyclic dicarboxylic acid structure exists as cis and trans geometric isomers.

The trans isomer ratio in the part derived from the (a) alicyclic dicarboxylic acid in the copolymer polyamide according to the present embodiment represents the ratio of trans isomers based on the whole alicyclic dicarboxylic acid in the copolymer polyamide. The trans isomer ratio is preferably 50 to 85 mol %, more preferably 50 to 80 mol %, and still more preferably 65 to 80 mol %.

As the (a) alicyclic dicarboxylic acid used as a raw material, an alicyclic dicarboxylic acid having a trans isomer/cis isomer ratio (molar ratio) of 50/50 to 0/100 is preferably used as described above. On the other hand, the trans isomer ratio in the portion derived from the (a) alicyclic dicarboxylic acid in the copolymer polyamide is preferably within the aforementioned range (for example, 50 to 80 mol %).

By setting the trans isomer ratio in the above-described range, in addition the characteristics of a high melting point and excellent toughness, strength, rigidity, and plasticizing time stability, the copolymer polyamide has qualities which simultaneously satisfy rigidity during heating due to a high Tg, fluidity, which is normally a quality that conflicts with heat resistance, and a high crystallinity. Furthermore, a copolymer polyamide composition containing this copolymer polyamide has excellent surface appearance and continuous productivity.

An example of a method for controlling the trans isomer ratio in the portion derived from the (a) alicyclic dicarboxylic acid in the copolymer polyamide to fall in the aforementioned range includes a method for controlling a polymerization method and polymerization conditions for the copolymer polyamide. If a copolymer polyamide is produced by hot melt polymerization, a melt state is preferably kept until the polymerization is completed. In order to keep a melt state, it is necessary to perform the production under polymerization conditions suitable to a copolymer polyamide composition. Specifically, for example, a polymerization pressure is controlled to be a high pressure of 23 to 50 kg/cm$^2$ (gauge pressure) and preferably 25 kg/cm$^2$ (gauge pressure) or more, and while continuing heating, a pressure within a tank is lowered over 30 minutes or more to atmospheric pressure (gauge pressure of 0 kg/cm$^2$).

In the present embodiment, the trans isomer ratio in the copolymer polyamide can be obtained, for example, by dissolving 30 to 40 mg of the copolymer polyamide in 1.2 g of hexafluoroisopropanol deuteride and subjecting the thus obtained solution to the $^1$H-NMR. Specifically, for 1,4-cyclohexanedicarboxylic acid, the trans isomer ratio can be determined from a ratio of the peak surface area at 1.98 ppm derived from trans isomers and the peak surface areas at 1.77 ppm and 1.86 ppm derived from cis isomers obtained in the measurement of the $^1$H-NMR.

The biomass plastic ratio of the copolymer polyamide according to the present embodiment is preferably 25% or more. The biomass plastic ratio means a ratio, in the copolymer polyamide, of units formed from biomass derived materials, and is calculated by the method described in the example below. The biomass plastic ratio is more preferably 30% or more. The upper limit of the biomass plastic ratio of the copolymer polyamide according to the present embodiment is not especially limited and is, for example, 80%.

A biomass derived material herein means a monomer, out of the components (a) to (c) corresponding to the constituent components of the copolymer polyamide, that can be synthesized from a starting material of a component of a plant or the like. Examples of the biomass derived material include sebacic acid, decamethylenediamine and 11-aminoundecanoic acid that can be synthesized from triglyceride ricinoleate, that is, a main component of castor oil, azelaic acid that can be synthesized from a component of a sunflower seed, and pentamethylenediamine and γ-aminobutyric acid that can be synthesized from cellulose.

Since the biomass is accumulated by absorbing a carbon dioxide gas contained in the atmosphere through photosynthesis, even when plastic obtained from such a material is burned after use so as to release carbon dioxide to the atmosphere, the thus released carbon dioxide gas was originally present in the atmosphere, and hence, the carbon dioxide concentration in the atmosphere is not thus increased.

Accordingly, it is extremely useful for reduction of the environmental load that the copolymer polyamide has a high biomass plastic ratio. An example of a method for increasing the biomass plastic ratio of the copolymer polyamide includes a method for increasing the blend ratios of the above-described biomass derived materials in the production of the copolymer polyamide.

The molecular weight of the copolymer polyamide according to the present embodiment uses sulfuric acid relative viscosity ηr at 25° C. as an index.

The sulfuric acid relative viscosity ηr at 25° C. of the copolymer polyamide according to the present embodiment is, from the perspectives of, for example, mechanical properties such as toughness, strength and rigidity, moldability and the like, preferably 1.5 to 7.0, more preferably 1.7 to 6.0 and still more preferably 1.9 to 5.5.

An example of a method for controlling the sulfuric acid relative viscosity ηr at 25° C. of the copolymer polyamide to fall in this range includes a method for controlling the added amounts of the diamine and the end-capping agent added as additives in the hot melt polymerization of the copolymer polyamide and the polymerization conditions.

The measurement of the sulfuric acid relative viscosity ηr at 25° C. of the copolymer polyamide can be carried out in the present embodiment on the basis of JIS-K6920 as described in the example below.

The peak melting temperature (melting point) $T_{pm-1}$ of the copolymer polyamide according to the present embodiment is, from the perspective of heat resistance, preferably 280° C. or more, more preferably 280° C. or more and 330° C. or less, still more preferably 300° C. or more and 330° C. or less, and particularly preferably 310° C. or more and 325° C. or less. A copolymer polyamide having a peak melting temperature $T_{pm-1}$ of 330° C. or less is preferred because pyrolysis of such a copolymer polyamide can be suppressed during melt processing such as extrusion and molding.

An example of a method for controlling the peak melting temperature (melting point) $T_{pm-1}$ of the copolymer polyamide to fall in the aforementioned range includes a method for using the aforementioned components (a) to (c) as copolymer components and controlling the blend ratios of the copolymer components to fall in the aforementioned ranges.

In the present embodiment, the peak melting temperature (melting point), the crystallization peak temperature and the crystallization enthalpy of the copolymer polyamide can be measured through the differential scanning calorimetry (DSC) on the basis of JIS-K7121. Specifically, the measurement can be carried out as follows.

As a measurement apparatus, Diamond-DSC manufactured by PERKIN-ELMER Inc. can be used. As for measurement conditions, the temperature of about 10 mg of a specimen is increased from 50° C. to 350° C. at a rate of temperature increase of 20° C./min in a nitrogen atmosphere. An endothermic peak appearing during the temperature increase is taken as a melting peak, and a peak appearing at the highest temperature is taken as a peak melting temperature $T_{pm}$. Subsequently, the temperature is kept at 350° C. for 3 minutes and lowered from 350° C. to 50° C. at a rate of temperature decrease of 20° C./min. An exothermic peak appearing during the temperature decrease is taken as a crystallization peak, the temperature is taken as a crystallization peak temperature $T_{pc-1}$, and a crystallization peak area is taken as crystallization enthalpy. Subsequently, after keeping the temperature at 50° C. for 3 minutes, the temperature is increased again from 50° C. to 350° C. at a rate of temperature increase of 20° C./min. An endothermic peak appearing at the highest temperature during this temperature increase is taken as a peak melting temperature $T_{pm-1}$, and an endothermic peak appearing at the lowest temperature is taken as a peak melting temperature $T_{pm-2}$. If merely one endothermic peak appears here, the endothermic peak is taken as peak melting temperatures $T_{pm-1}$ and $T_{pm-2}$ ($T_{pm-1}=T_{pm-2}$). Furthermore, after keeping the temperature at 350° C. for 3 minutes, the temperature is lowered from 350° C. to 50° C. at a rate of temperature decrease of 50° C./min. A crystallization peak temperature appearing during this temperature decrease is taken as a crystallization peak temperature $T_{pc-2}$.

In the copolymer polyamide according to the present embodiment, a difference ($T_{pm}-T_{pm-1}$) between the peak melting temperature $T_{pm}$ and the peak melting temperature $T_{pm-1}$ is 30° C. or less, preferably 0 to 20° C. and more preferably 0 to 10° C. In the copolymer polyamide, a smaller difference ($T_{pm}-T_{pm-1}$) between the peak melting temperature $T_{pm}$ and the peak melting temperature $T_{pm-1}$ means that the portion derived from the alicyclic dicarboxylic acid in the copolymer polyamide is in a thermodynamically more stable structure. A copolymer polyamide having a difference ($T_{pm}-T_{pm-1}$) between the peak melting temperature $T_{pm}$ and the peak melting temperature $T_{pm-1}$ within the aforementioned range has excellent plasticizing time stability. Furthermore, a copolymer polyamide composition containing this copolymer polyamide has excellent surface appearance and continuous productivity. An example of a method for controlling, in the copolymer polyamide, the difference ($T_{pm}-T_{pm-1}$) between the peak melting temperature $T_{pm}$ and the peak melting temperature $T_{pm-1}$ to fall in the aforementioned range includes a method for using the aforementioned components (a) to (c) as copolymer components, controlling the blend ratios of the copolymer components to fall in the aforementioned ranges, and controlling the trans isomer ratio derived from the (a) alicyclic dicarboxylic acid in the copolymer polyamide to fall in a range of 65 to 80 mol %.

From the perspective of heat resistance, the peak melting temperature $T_{pm-2}$ of the copolymer polyamide according to the present embodiment is preferably 270° C. or more, more preferably 270 to 320° C., and still more preferably 280 to 310° C.

An example of a method for controlling the peak melting temperature (melting point) $T_{pm-2}$ of the copolymer polyamide to fall in this range includes a method for using the aforementioned components (a) to (c) as copolymer components, and controlling the blend ratios of the copolymer components to fall in the aforementioned ranges.

Furthermore, in the copolymer polyamide according to the present embodiment, a difference $(T_{pm-1}-T_{pm-2})$ between the peak melting temperature $T_{pm-1}$ and the peak melting temperature $T_{pm-2}$ is preferably 30° C. or less and more preferably 10 to 20° C. The difference $(T_{pm-1}-T_{pm-2})$ between the peak melting temperature $T_{pm-1}$ and the peak melting temperature $T_{pm-2}$ of the copolymer polyamide is preferably in this range from the perspectives of releasability and low blocking properties.

An example of a method for controlling the difference $(T_{pm-1}-T_{pm-2})$ between the peak melting temperature $T_{pm-1}$ and the peak melting temperature $T_{pm-2}$ of the copolymer polyamide to fall in the aforementioned range includes a method for using the aforementioned components (a) to (c) as copolymer components, and controlling the blend ratios of the copolymer components to fall in the aforementioned ranges.

From the perspectives of low blocking properties and releasability, the crystallization peak temperature $T_{pc-1}$ of the copolymer polyamide according to the present embodiment is preferably 250° C. or more and more preferably 260° C. or more and 300° C. or less.

An example of a method for controlling the crystallization peak temperature $T_{pc-1}$ of the copolymer polyamide to fall in this range includes a method for using the aforementioned components (a) to (c) as copolymer components, and controlling the blend ratios of the copolymer components to fall in the aforementioned ranges.

From the perspectives of low blocking properties and releasability, the crystallization peak temperature $T_{pc-2}$ of the copolymer polyamide according to the present embodiment is preferably 240° C. or more and more preferably 240° C. or more and 280° C. or less.

An example of a method for controlling the crystallization peak temperature $T_{pc-2}$ of the copolymer polyamide to fall in this range includes a method for using the aforementioned components (a) to (c) as copolymer components, and controlling the blend ratios of the copolymer components to fall in the aforementioned ranges.

Furthermore, in the copolymer polyamide according to the present embodiment, a difference $(T_{pc-1}-T_{pc-2})$ between the crystallization peak temperature $T_{pc-1}$ and the crystallization peak temperature $T_{pc-2}$ is preferably 10° C. or less. A smaller difference $(T_{pc-1}-T_{pc-2})$ between the crystallization peak temperature $T_{pc-1}$ and the crystallization peak temperature $T_{pc-2}$ of the copolymer polyamide means that a crystallization speed is high and the copolymer polyamide has a stable crystal structure. The difference $(T_{pc-1}-T_{pc-2})$ between the crystallization peak temperature $T_{pc-1}$ and the crystallization peak temperature $T_{pc-2}$ of the copolymer polyamide is preferably in the aforementioned range from the perspectives of low blocking properties and releasability.

An example of a method for controlling the difference $(T_{pc-1}-T_{pc-2})$ between the crystallization peak temperature $T_{pc-1}$ and the crystallization peak temperature $T_{pc-2}$ of the copolymer polyamide to fall in the aforementioned range includes a method for using the aforementioned components (a) to (c) as copolymer components, and controlling the blend ratios of the copolymer components to fall in the aforementioned ranges. Furthermore, in order to attain a stable crystal structure of the copolymer polyamide by reducing the difference $(T_{pc-1}-T_{pc-2})$, it is preferable to set the number of carbon atoms in the copolymer components (a) to (c) to an even number, to make a carbon chain straight, and to set a ratio between the number of carbon atoms and the number of amide groups (the carbon atom number/the amide group number) in the copolymer polyamide to be 8 or more and less than 9.

From the perspectives of heat resistance, low blocking properties and releasability, the crystallization enthalpy of the copolymer polyamide according to the present embodiment is preferably 10 J/g or more, more preferably 15 J/g or more and still more preferably 20 J/g or more. The upper limit of the crystallization enthalpy of the copolymer polyamide according to the present embodiment is not especially limited but is 100 J/g or less.

An example of a method for controlling the crystallization enthalpy of the copolymer polyamide to fall in the aforementioned range includes a method for setting the ratio between the number of carbon atoms and the number of amide groups (the carbon atom number/the amide group number) in the copolymer polyamide to 8 or more, using the aforementioned components (a) to (c) copolymer components, and controlling the blend ratios of the copolymer components to fall in the aforementioned ranges.

The glass transition temperature Tg of the copolymer polyamide according to the present embodiment is preferably 90° C. or more and 170° C. or less, more preferably 90° C. or more and 140° C. or less, and still more preferably 100° C. or more and 140° C. or less. By setting the glass transition temperature Tg to 90° C. or more, a copolymer polyamide which has excellent heat resistance and chemical resistance can be obtained. Furthermore, by setting the glass transition temperature to 170° C. or less, a molded product with good surface appearance can be obtained from such a copolymer polyamide.

An example of a method for controlling the glass transition temperature Tg of the copolymer polyamide to fall in the aforementioned range includes a method for using the aforementioned components (a) to (c) as copolymer components, and controlling the blend ratios of the copolymer components to fall in the aforementioned ranges.

In the present embodiment, the glass transition temperature Tg can be measured by the differential scanning calorimetry (DSC) on the basis of JIS-K7121. Specifically, the glass transition temperature can be measured by the method described in the example below.

In the copolymer polyamide according to the present embodiment, a difference $(T_{pc-1}-Tg)$ between the crystallization peak temperature $T_{pc-1}$ obtained in decreasing a temperature at 20° C./min in the differential scanning calorimetry and the glass transition temperature Tg is 140° C. or more, more preferably 145° C. or more and still more preferably 150° C. or more. A larger difference $(T_{pc-1}-Tg)$ between the crystallization peak temperature $T_{pc-1}$ and the glass transition temperature Tg of the copolymer polyamide means that a temperature range for crystallization is larger and that the copolymer polyamide has a stable crystal structure. A copolymer polyamide having a difference $(T_{pc-1}-Tg)$ between the crystallization peak temperature $T_{pc-1}$ and the glass transition temperature Tg of 140° C. or more has excellent low blocking properties and releasability. The upper limit of the difference $(T_{pc-1}-Tg)$ between the crystallization peak temperature $T_{pc-1}$ and the glass transition temperature Tg is not especially limited but is 300° C. or less.

An example of a method for controlling the difference $(T_{pc-1}-Tg)$ between the crystallization peak temperature $T_{pc-1}$ and the glass transition temperature Tg of the copolymer polyamide includes a method for using the aforementioned components (a) to (c) as copolymer components, and controlling the blend ratios of the copolymer components to fall in the aforementioned ranges. Furthermore, in order to attain a stable crystal structure of the copolymer polyamide by increasing the difference $(T_{pc-1}-Tg)$, it is preferable to set the number of carbon atoms in the copolymer components (a) to (c) to an even number, to make a carbon chain straight, and to set the ratio between the number of carbon atoms and the number of amide groups (the carbon atom number/the amide group number) in the copolymer polyamide to be 8 or more and less than 9.

Polymer terminals of the copolymer polyamide according to the present embodiment are classified and defined as follows:

1) amino terminals, 2) carboxyl terminals, 3) terminals capped by a capping agent, and 4) other terminals.

The polymer terminal of the copolymer polyamide means a terminal portion of a polymer chain formed by polymerizing a dicarboxylic acid and a diamine through an amide bond. The polymer terminals of the copolymer polyamide include one or more of these 1) to 4) terminals.

The 1) amino terminal is a polymer terminal bonded to an amino group (—$NH_2$ group) and derives from the diamine used as the raw material.

The 2) carboxyl terminal is a polymer terminal bonded to a carboxyl group (—COOH group) and derives from the dicarboxylic acid used as the raw material.

The 3) terminal capped by a capping agent is a polymer terminal capped by the carboxylic acid or amine added in the polymerization.

The 4) other terminals are polymer terminals not classified into any of the 1) to 4) terminals, and examples of the other terminals include a terminal produced from the amino terminal through a deammoniation reaction and a terminal produced from the carboxyl terminal through a decarboxylation reaction.

A ratio of the amount of amino terminals to the total amount of amino terminals and carboxyl terminals {the amount of amino terminals/(the amount of amino terminals+ the amount of carboxyl terminals)} in the copolymer polyamide according to the present embodiment is not especially limited but is preferably 0.3 or more, more preferably 0.5 or more and still more preferably 0.7 or more. The upper limit of the ratio of the amount of amino terminals to the total amount of amino terminals and carboxyl terminals {the amount of amino terminals/(the amount of amino terminals+ the amount of carboxyl terminals)} of the copolymer polyamide according to the present embodiment is preferably less than 1.0. By setting the ratio of the amount of amino terminals to the total amount of amino terminals and carboxyl terminals of the copolymer polyamide to 0.3 or more, the strength, toughness, stability in heating and resistance to hydrolysis of the copolymer polyamide can be improved. Furthermore, a copolymer polyamide composition containing this copolymer polyamide has excellent vibration fatigue characteristics.

An example of a method for controlling the ratio of the amount of amino terminals to the total amount of amino terminals and carboxyl terminals {the amount of amino terminals/(the amount of amino terminals+the amount of carboxyl terminals)} of the copolymer polyamide includes a method for controlling the added amounts of a diamine and an end-capping agent added as additives in the hot melt polymerization of the copolymer polyamide and the polymerization conditions.

The amount of amino terminals bonded to polymer terminals is measured by neutralization titration. Specifically, 3.0 g of polyamide is dissolved in 100 mL of a 90 mass % phenol aqueous solution, and the thus obtained solution is subjected to titration with 0.025 N hydrochloric acid, so as to obtain the amount of amino terminals. The end point is determined in accordance with an indicated value of a pH meter.

The amount of carboxyl terminals bonded to polymer terminals is measured by neutralization titration. Specifically, 4.0 g of polyamide is dissolved in 50 mL of benzyl alcohol, and the thus obtained solution is subjected to titration with 0.1 N NaOH, so as to obtain the amount of carboxyl terminals. The end point is determined in accordance with change in color of a phenolphthalein indicator.

In the copolymer polyamide according to the present embodiment, the ratio between the number of carbon atoms and the number of amide groups (the carbon atom number/ the amide group number) is, from the perspective of low water absorbance, 8 or more and preferably 8.2 or more and less than 9. The ratio between the number of carbon atoms and the number of amide groups (the carbon atom number/ the amide group number) is an index corresponding to an amino group concentration in the copolymer polyamide. By setting the ratio between the number of carbon atoms and the number of amide groups (the carbon atom number/the amide group number) to the aforementioned range, a copolymer polyamide which has excellent strength, high-temperature strength, low water absorbance, low blocking properties, releasability and plasticizing time stability, and a copolymer polyamide composition which has excellent vibration fatigue characteristics, surface appearance and continuous productivity can be provided.

An example of a method for controlling the ratio between the number of carbon atoms and the number of amide groups (the carbon atom number/the amide group number) in the copolymer polyamide includes a method for using the aforementioned components (a) to (c) as copolymer components and controlling the blend ratios of the copolymer components to fall in the aforementioned ranges.

The ratio (the carbon atom number/the amide group number) working as the index corresponding to the amino group concentration can be obtained through calculation of an average number of carbon atoms per amide group in the copolymer polyamide. Specifically, it can be obtained by the method described in the example below.

[Production Method for Copolymer Polyamide]

A production method for the copolymer polyamide according to the present embodiment is not especially limited as long as a copolymer polyamide having characteristics satisfying the aforementioned conditions (1) to (3) and the like can be obtained. An example of the production method includes a method for producing a copolymer polyamide comprising a step of polymerizing the (a) at least one alicyclic dicarboxylic acid, the (b) at least one diamine having 8 or more carbon atoms and the (c) at least one copolymer component.

It is preferred that the method for producing the copolymer polyamide according to the present embodiment further comprises a step of increasing the degree of polymerization of the copolymer polyamide.

As illustrated by the following production method examples, there are various methods for producing the copolymer polyamide according to the present embodiment.
1) Heating an aqueous solution or an aqueous suspension of a dicarboxylic acid and a diamine salt or a mixture thereof, and polymerizing while maintaining the melt state (hereinafter, sometimes abbreviated as "hot melt polymerization").
2) Increasing the degree of polymerization while maintaining a solid state at a temperature at or below the melting point of a polyamide obtained by hot melt polymerization (hereinafter, sometimes abbreviated as "hot melt polymerization/solid phase polymerization").
3) (A "melt method") in which polymerization is carried out using a dicarboxylic acid halide component equivalent to the dicarboxylic acid and a diamine component.

Especially, a production method including the hot melt polymerization is preferred, and if a copolymer polyamide is produced by the hot melt polymerization, a melt state is preferably kept until the polymerization is completed. In order to keep a melt state, it is necessary to perform the production under polymerization conditions suitable to a copolymer polyamide composition. For example, a polymerization pressure employed in the hot melt polymerization is controlled to be a high pressure of 23 to 50 kg/cm² (gauge pressure) and preferably 25 kg/cm² (gauge pressure) or more, and while continuing heating, a pressure within a tank is lowered over 30 minutes or more to atmospheric pressure (gauge pressure of 0 kg/cm²). A copolymer polyamide obtained by such a production method can satisfy the characteristics of the aforementioned conditions (1) to (3), the trans isomer ratio and the like.

In the method for producing a copolymer polyamide according to the present embodiment, from the perspective of fluidity of the copolymer polyamide, it is preferable to carry out the polymerization while maintaining the trans isomer ratio of the portion derived from the (a) alicyclic dicarboxylic acid in the copolymer polyamide to be obtained at 85% or less. Especially, when the trans isomer ratio is maintained at 80% or less and more preferably 65 to 80%, a copolymer polyamide having a high melting point which has more excellent color tone, tensile elongation and plasticizing time stability can be obtained. Furthermore, a copolymer polyamide composition containing this copolymer polyamide has excellent surface appearance and continuous productivity.

In the copolymer polyamide production method according to the present embodiment, to increase the melting point of the copolymer polyamide by increasing the degree of polymerization, it may necessary to increase the heating temperature and/or lengthen the heating time. However, in such a case, the coloration of the polyamide can deteriorate due to the heating and the tensile elongation can deteriorate due to pyrolysis. Further, the rate of increase of the molecular weight may also dramatically deteriorate.

In order to prevent the coloration, deterioration in tensile elongation due to pyrolysis and deterioration of plasticizing time stability of the copolymer polyamide, and furthermore, in order to prevent deterioration of surface appearance and continuous productivity of a copolymer polyamide composition containing this copolymer polyamide, it is suitable to carry out the polymerization with the trans isomer ratio maintained at 80% or less.

As a method for producing a copolymer polyamide according to the present embodiment, a method for producing a copolymer polyamide by the 1) hot melt polymerization or the 2) hot melt polymerization/solid phase polymerization is preferred. When such a production method is employed, the trans isomer ratio in the copolymer polyamide can be easily maintained at 80% or less, and the obtained copolymer polyamide has excellent color tone and plasticizing time stability. Furthermore, a copolymer polyamide composition containing this copolymer polyamide has excellent surface appearance and continuous productivity.

In the copolymer polyamide production method according to the present embodiment, the polymerization mode may be either a batch method or a continuous method.

The polymerization apparatus is not especially limited. Examples of the polymerization apparatus include known apparatuses, such as an autoclave type reactor, a tumbler type reactor, and an extruder type reactor such as a kneader.

The method for producing a copolymer polyamide according to the present embodiment is not especially limited as long as a copolymer polyamide satisfying the characteristics of the aforementioned conditions (1) to (3) and the like can be obtained, and for example, a copolymer polyamide can be produced by batch hot melt polymerization as described below.

An example of the method for producing a copolymer polyamide by the batch hot melt polymerization includes the following. In producing a copolymer polyamide by the hot melt polymerization, it is preferred to keep a melt state until the polymerization is completed. In order to keep a melt state, it is necessary to carry out the production under polymerization conditions suitable to a copolymer polyamide composition.

With water used as a solvent, an approximately 40 to 60 mass % solution containing copolymer polyamide components (the aforementioned components (a) to (c)) is concentrated in a concentration tank operated at a temperature of 110 to 180° C. and a pressure of about 0.35 to 6 kg/cm² (gauge pressure) to about 65 to 90 mass % to obtain a concentrated solution. Then, this concentrated solution is transferred to an autoclave, and heating is continued until a pressure in the vessel reaches about 23 to 50 kg/cm² (gauge pressure). Subsequently, the pressure is kept at about 23 to 50 kg/cm² (gauge pressure) while extracting water and/or a gas component. In order to keep a melt state here, a pressure suitable to a copolymer polyamide composition is necessary, and especially when a diamine having a large number of carbon atoms is used, the pressure within the vessel is preferably 25 kg/cm² (gauge pressure) or more. When the temperature within the vessel reaches about 250 to 350° C., the pressure within the vessel is lowered to atmospheric pressure (gauge pressure of 0 kg/cm²). In order to keep a melt state here, it is preferable to lower the pressure over 30 minutes or more while continuing the heating. After lowering the pressure to atmospheric pressure, water produced as a byproduct can be effectively removed by reducing the pressure as necessary. Then, the pressure is increased with an inert gas such as nitrogen, and a polyamide melt product is extruded as a strand. A final temperature of a resin temperature (solution temperature) is preferably higher than the temperature $T_{pm-1}$ by 10° C. or more for keeping a melt state. The strand is cooled and cut to obtain pellets of the copolymer polyamide.

[Copolymer Polyamide Composition]

A copolymer polyamide composition according to the present embodiment contains the aforementioned copolymer polyamide and one or more components selected from the group consisting of an inorganic filler, a nucleating agent, a lubricant, a stabilizer and a polymer other than the copolymer polyamide.

<Inorganic Filler>

Examples of the inorganic filler are not limited to but include a glass fiber, a carbon fiber, a calcium silicate fiber, a potassium titanate fiber, an aluminum borate fiber, clay, glass flakes, talc, kaolin, mica, hydrotalcite, calcium carbonate, magnesium carbonate, zinc carbonate, zinc oxide, calcium phosphate monobasic, wollastonite, silica, zeolite, alumina, boehmite, aluminum hydroxide, titanium oxide, silicon oxide, magnesium oxide, calcium silicate, sodium aluminosilicate, magnesium silicate, Ketchen black, acetylene black, furnace black, carbon nanotubes, graphite, brass, copper, silver, aluminum, nickel, iron, calcium fluoride, montmorillonite, expandable fluorine mica, and an apatite.

Especially, from the perspective of further improving the mechanical strength, one or more selected from the group consisting of a glass fiber, a carbon fiber, wollastonite, kaolin, mica, talk, calcium carbonate, magnesium carbonate, a potassium titanate fiber, an aluminum borate fiber and clay are preferable. Of these, one or more selected from the group consisting of a glass fiber, a carbon fiber, wollastonite, kaolin, mica, talk, calcium carbonate and clay are more preferable.

First, a glass fiber or a carbon fiber may be in a true circular shape or a flat shape in its cross-section. Examples of the flat shape of the cross-section are not limited to but include a rectangular shape, an oblong shape close to a rectangular shape, an elliptic shape and a cocoon shape having a constricted portion in the center along the lengthwise direction. An "ellipticity" herein means a value expressed by $D2/D1$ assuming that the fiber cross-section has a major axis $D2$ and a minor axis $D1$ (incidentally, a true circular shape has an ellipticity of approximately 1).

Out of various glass fibers and carbon fibers, from the perspective that a copolymer polyamide composition may be provided with excellent mechanical strength, those having a number average fiber diameter of 3 to 30 μm, a weight average fiber length of 100 to 750 μm and an aspect ratio (L/D) between the weight average fiber length (L) and the number average fiber diameter (D) of 10 to 100 may be preferably used.

Furthermore, from the perspectives of reducing a bend of a plate-shaped molded product and improving heat resistance, toughness, low water absorbance and thermal aging resistance, the ellipticity is preferably 1.5 or more, more preferably 1.5 to 10.0, still more preferably 2.5 to 10.0 and even still more preferably 3.1 to 6.0. By setting the ellipticity to this range, the inorganic filler can be effectively prevented from being crushed in processing of mixing, kneading and molding with other components, and desired effects for a molded product can be sufficiently attained.

The thickness of a glass fiber or a carbon fiber having an ellipticity of 1.5 or more is not limited to but is preferably 0.5 to 25 μm in the minor axis $D1$ of the fiber cross-section and 1.25 to 250 μm in the major axis $D2$ of the fiber cross-section. When the axes are in these ranges, difficulty in spinning of fiber can be effectively avoided, and the strength of a molded product can be improved without decreasing a contact area with a resin (polyamide). The minor axis $D1$ is more preferably 3 to 25 μm, and still more preferably, the minor axis $D1$ is 3 to 25 μm and the ellipticity is larger than 3.

Such a glass fiber or a carbon fiber having an ellipticity of 1.5 or more can be produced by methods, for example, described in Japanese Patent Publication No. 3-59019, Japanese Patent Publication No. 4-13300, Japanese Patent Publication No. 4-32775 and the like. Especially, a glass fiber having an ellipticity of 1.5 or more is preferably produced by using either an orifice plate having a large number of orifices on a bottom thereof and a convex edge surrounding outlets of the orifices and extending downward from the bottom, or a nozzle tip for spinning modified cross-section glass fiber having a single or a plurality of orifice holes and a plurality of convex edges extending downward from the end of a circumferential portion thereof. Such a fibrous reinforcing material can be directly used with a fiber strand used as a roving, or can be used as chopped glass strands after performing a cutting step.

The number average fiber diameter and the weight average fiber length herein mean values obtained as follows. A copolymer polyamide composition is put in an electric furnace for thermal disposal of an organic substance contained therein. From a residue of the thermal disposal, 100 or more glass fibers (or carbon fibers) are arbitrarily selected to be observed with a scanning electron microscope (SEM), and thus, fiber diameters of these glass fibers (or carbon fibers) are measured so as to obtain a number average fiber diameter. In addition, SEM micrographs of the 100 or more glass fibers (or carbon fibers) obtained at 1000× magnification are used for measuring fiber lengths, so as to obtain a weight average fiber length.

The glass fiber or carbon fiber may be subjected to a surface treatment with a silane coupling agent or the like. Examples of the silane coupling agent are not limited to but include aminosilanes such as γ-aminopropyltriethoxysilane, γ-aminopropyltrimethoxysilane and N-β-(aminoethyl)-γ-aminopropylmethyldimethoxysilane, mercaptosilanes such as γ-mercaptopropyltrimethoxysilane and γ-mercaptopropyltriethoxysilane, epoxysilanes, and vinylsilanes. Especially, one or more selected from the group consisting of the components cited above are preferably used, and aminosilanes are more preferably used.

The glass fiber or carbon fiber may include, as a sizing agent, a copolymer that includes, as constituent units, a carboxylic acid anhydride-containing unsaturated vinyl monomer and an unsaturated vinyl monomer excluding the carboxylic acid anhydride-containing unsaturated vinyl monomer; an epoxy compound; a polyurethane resin; a homopolymer of acrylic acid; a copolymer of acrylic acid and another copolymerizable monomer; salts of these with primary, secondary or tertiary amine; and a copolymer that includes a carboxylic acid anhydride-containing unsaturated vinyl monomer and an unsaturated vinyl monomer excluding the carboxylic acid anhydride-containing unsaturated vinyl monomer. One of these sizing agents may be used alone or two or more of them may be used in combination.

Especially, from the perspective of mechanical strength of a copolymer polyamide composition to be obtained, a copolymer that includes, as constituent units, a carboxylic acid anhydride-containing unsaturated vinyl monomer and an unsaturated vinyl monomer excluding the carboxylic acid anhydride-containing unsaturated vinyl monomer, an epoxy compound, a polyurethane resin or a combination of these is preferably used. More preferably, a copolymer that includes, as constituent units, a carboxylic acid anhydride-containing unsaturated vinyl monomer and an unsaturated vinyl monomer excluding the carboxylic acid anhydride-containing unsaturated vinyl monomer, a polyurethane resin or a combination of them is used.

The glass fiber or carbon fiber is obtained through a continuous reaction caused by drying a fiber strand produced with any of the aforementioned sizing agents added to the fiber by a known method using a roller type applicator or the like in a known production process for the fiber. The fiber strand may be directly used as the roving, or may be further cut to be used as chopped glass strands. Such a sizing agent is provided (added) in an amount, in terms of a solid content ratio, corresponding to preferably 0.2 to 3 mass % and more preferably 0.3 to 2 mass % based on 100 mass % of the glass fiber or carbon fiber. Specifically, from the perspective of maintaining bundling of the fiber, the added amount of the sizing agent is preferably 0.2 mass % or more in terms of a solid content ratio based on 100 mass % of the glass fiber or carbon fiber. On the other hand, from the perspective of improving thermal stability of a copolymer polyamide composition to be obtained, the added amount of the sizing agent is preferably 3 mass % or less. The strand may be dried after cutting, or the strand may be cut after drying.

As an inorganic filler other than the glass fiber and carbon fiber, from the perspective of improvement of the strength, rigidity and surface appearance of a molded product, wollastonite, kaolin, mica, talk, calcium carbonate, magnesium carbonate, potassium titanate fiber, aluminum borate fiber or clay is preferably used. More preferably, wollastonite, kaolin, mica, talk, calcium carbonate or clay is used, still more preferably, wollastonite, kaolin, mica or talk is used, even still more preferably, wollastonite or mica is used, and particularly preferably, wollastonite is used. One of these inorganic fillers may be used alone or two or more of them may be used in combination.

An average particle size of the inorganic filler other than the glass fiber or carbon fiber is, from the perspective of improvement of toughness and surface appearance of a molded product, preferably 0.01 to 38 μm, more preferably 0.03 to 30 μm, still more preferably 0.05 to 25 μm, even still more preferably 0.10 to 20 μm and particularly preferably 0.15 to 15 μm.

By setting the average particle size to 38 μm or less, a copolymer polyamide composition which has excellent toughness and surface appearance of a molded product can be obtained. On the other hand, by setting the average particle size to 0.1 μm or more, a copolymer polyamide composition well balanced in cost and handling of a powder and physical properties (such as fluidity) can be obtained.

Here, as for some of the inorganic fillers in a needle shape as wollastonite, a number average fiber diameter (hereinafter sometimes referred to simply as the "average fiber diameter") is defined as the average particle size. Also, if the cross-section is not in a circular shape, the maximum value of the length is defined as the (number average) fiber diameter.

A weight average fiber length (hereinafter sometimes referred to simply as the "average fiber length") of those in a needle shape preferably falls in a range of numerical values calculated from the aforementioned preferable range of the number average fiber diameter and a preferable range of an aspect ratio (L/D) between a weight average fiber length (L) and a number average fiber diameter (D) described below.

The aspect ratio (L/D) between a weight average fiber length (L) and a number average fiber diameter (D) of those in a needle shape is, from the perspectives of improvement of surface appearance of a molded product and prevention of abrasion of metal parts of an injection molding machine or the like, preferably 1.5 to 10, more preferably 2.0 to 5 and still more preferably 2.5 to 4.

Furthermore, the inorganic filler other than the glass fiber or carbon fiber used in the present embodiment may be subjected to a surface treatment with a silane coupling agent, a titanate-based coupling agent or the like. Examples of the silane coupling agent are not limited to but include aminosilanes such as γ-aminopropyltriethoxysilane, γ-aminopropyltrimethoxysilane and N-β-(aminoethyl)-γ-aminopropylmethyldimethoxysilane, mercaptosilanes such as γ-mercaptopropyltrimethoxysilane and γ-mercaptopropyltriethoxysilane, epoxysilanes, and vinylsilanes. Especially, one or more selected from the group consisting of the components cited above are preferably used, and aminosilanes are more preferably used. Such a coupling agent may be precedently used for treating the surface of the inorganic filler or may be added in mixing the copolymer polyamide and the inorganic filler. Besides, the added amount of the coupling agent is preferably 0.05 to 1.5 mass % based on 100 mass % of the inorganic filler.

The content of the inorganic filler is preferably 1 to 200 parts by mass, more preferably 2 to 150 parts by mass, still more preferably 5 to 120 parts by mass and particularly preferably 10 to 80 parts by mass based on 100 parts by mass of the copolymer polyamide.

By setting the content of the inorganic filler to 1 part by mass or more based on 100 parts by mass of the copolymer polyamide, an effect to improve the strength and rigidity of a copolymer polyamide composition to be obtained can be exhibited. On the other hand, by setting the content of the inorganic filler to 200 parts by mass or less based on 100 parts by mass of the copolymer polyamide, a copolymer polyamide composition which has excellent extrudability and moldability can be obtained.

<Nucleating Agent>

The nucleating agent is not limited to examples below but means a substance that shows, when added, effects to increase the crystallization peak temperature of a copolymer polyamide composition, to decrease a difference between the extrapolated onset temperature and the extrapolated end temperature of the crystallization peak, or to refine or equalize the size of spherulites of a molded product to be obtained. Examples of the nucleating agent include talk, boron nitride, mica, kaolin, calcium carbonate, barium sulfate, silicon nitride, carbon black, potassium titanate and molybdenum disulfide.

One of such nucleating agents may be used or two or more of them may be used in combination.

From the perspective of nucleating agent effects, the nucleating agent is preferably talk or boron nitride.

Furthermore, the nucleating agent has a number average particle size preferably of 0.01 to 10 μm because such a nucleating agent has high nucleating agent effects.

The number average particle size of the nucleating agent can be measured as follows: A molded product is dissolved in a polyamide-soluble solvent such as formic acid, and from the thus obtained insoluble components, for example, 100 or more particles of the nucleating agent are arbitrarily selected and observed with an optical microscope, a scanning electron microscope or the like, so as to obtain the average particle size.

The blend amount of the nucleating agent is preferably 0.001 to 1 part by mass, more preferably 0.001 to 0.5 part by mass and still more preferably 0.001 to 0.09 part by mass based on 100 parts by mass of the copolymer polyamide.

By setting the blend amount of the nucleating agent to 0.001 part by mass or more based on 100 parts by mass of the copolymer polyamide, the heat resistance of the polyamide composition may be satisfactorily improved, and by setting the blend amount of the nucleating agent to 1 part by mass or less based on 100 parts by mass of the copolymer polyamide, a copolymer polyamide composition which has excellent toughness can be obtained.

<Lubricant>

Examples of the lubricant are not limited to but include higher fatty acids, higher fatty acid metal salts, higher fatty acid esters and higher fatty acid amides.

One of such lubricants may be used or two or more of them may be used in combination.

Examples of the higher fatty acids include saturated or unsaturated straight or branched aliphatic monocarboxylic acids having 8 to 40 carbon atoms, such as stearic acid, palmitic acid, behenic acid, erucic acid, oleic acid, lauric acid and montanoic acid, and preferably, stearic acid, montanoic acid or the like is used.

One of such higher fatty acids may be used or two or more of them may be used in combination.

The higher fatty acid metal salts refer to metal salts of the above-described higher fatty acids.

As a metal element constituting a higher fatty acid metal salt, group 1, 2 and 3 elements of the periodic table, zinc and aluminum are preferably used, and group 1 and 2 elements such as calcium, sodium, potassium and magnesium, and aluminum are more preferably used.

Examples of the higher fatty acid metal salts include calcium stearate, aluminum stearate, zinc stearate, magnesium stearate, calcium montanate, sodium montanate and calcium palmitate, and preferably, metal salts of montanoic acid and metal salts of stearic acid are used.

One of such higher fatty acid metal salts may be used or two or more of them may be used in combination.

The higher fatty acid esters refer to ester compounds of the aforementioned higher fatty acids and alcohol. Esters of aliphatic carboxylic acids having 8 to 40 carbon atoms and aliphatic alcohols having 8 to 40 carbon atoms are preferably used.

Examples of the aliphatic alcohol include stearyl alcohol, behenyl alcohol and lauryl alcohol.

Examples of the higher fatty acid esters include stearyl stearate and behenyl behenate.

One of such higher fatty acid esters may be used or two or more of them may be used in combination.

The higher fatty acid amides refer to amide compounds of the above-described higher fatty acids.

Examples of the higher fatty acid amides include stearamide, oleamide, erucic amide, ethylene bisstearyl amide, ethylene bisoleyl amide, N-stearyl stearyl amide and N-stearyl erucic amide.

As the higher fatty acid amide, stearamide, erucic amide, ethylene bisstearyl amide and N-stearyl erucic amide are preferably used, and ethylene bisstearyl amide and N-stearyl erucic amide are more preferably used.

One of such higher fatty acid amides may be used or two or more of them may be used in combination.

From the perspective of an effect to improve moldability, the lubricant is preferably a higher fatty acid metal salt or a higher fatty acid amide, and more preferably a higher fatty acid metal salt.

The content of the lubricant in the copolymer polyamide composition according to the present embodiment is preferably 0.001 to 1 part by mass and more preferably 0.03 to 0.5 part by mass based on 100 parts by mass of the copolymer polyamide.

By setting the content of the lubricant to this range, a copolymer polyamide composition which has excellent releasability and plasticizing time stability and has excellent toughness can be obtained, and in addition, excessive molecular weight lowering of the polyamide caused by breakage of molecular chains can be prevented.

<Stabilizer>

Examples of the stabilizer are not limited to but include phenol-based thermal stabilizers, phosphorous-based thermal stabilizers, amine-based thermal stabilizers, and metal salts of group 3, 4 and 11 to 14 elements of the periodic table, and halides of alkali metals and alkali earth metals.

Examples of the phenol-based thermal stabilizers include hindered phenol compounds. The hindered phenol compounds have the property of providing excellent heat resistance and light resistance to a resin such as polyamide or fiber.

Examples of hindered phenol compounds include N,N'-hexane-1,6-diylbis[3-(3,5-di-t-butyl-4-hydroxyphenylpropionamide), pentaerythrityl-tetrakis[3-(3,5-di-t-butyl-4-hydroxyphenyl)propionate], N,N'-hexamethylenebis(3,5-di-t-butyl-4-hydroxy-hydrocinnamamide), triethyleneglycol-bis[3-(3-t-butyl-5-methyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxapiro[5,5]undecane, 3,5-di-t-butyl-4-hydroxybenzylphosphonate-diethyl ester, 1,3,5-trimethyl-2,4,6-tris(3,5-di-t-butyl-4-hydroxybenzyl)benzene, and 1,3,5-tris(4-t-butyl-3-hydroxy-2,6-dimethylbenzyl)isocyanurate. As a phenolic stabilizer, one kind may be used, or two or more kinds may be used in combination. Especially, from the perspective of improvement of the thermal aging resistance, N,N'-hexane-1,6-diylbis[3-(3,5-di-t-butyl-4-hydroxyphenylpropionamide)] is preferably used.

If a phenol-based thermal stabilizer is used, the content of the phenol-based thermal stabilizer in the copolymer polyamide composition is preferably 0.01 to 1 part by mass and more preferably 0.1 to 1 part by mass based on 100 parts by mass of the copolymer polyamide composition. If the content of the phenol-based thermal stabilizer falls in this range, the thermal aging resistance of the copolymer polyamide composition can be further improved and the amount of generated gas can be reduced.

Examples of phosphorous-based thermal stabilizers may include pentaerythritol type phosphite compounds, trioctyl phosphite, trilauryl phosphite, tridecyl phosphite, octyldiphenyl phosphite, trisisodecyl phosphite, phenyl diisodecyl phosphite, phenyl di(tridecyl)phosphite, diphenyl isooctyl phosphite, diphenyl isodecyl phosphite, diphenyl(tridecyl) phosphite, triphenyl phosphite, tris(nonylphenyl)phosphite, tris(2,4-di-t-butylphenyl)phosphite, tris(2,4-di-t-butyl-5-methylphenyl)phosphite, tris(butoxyethyl) phosphite, 4,4'-butylidene-bis(3-methyl-6-t-butylphenyl-tetra-tridecyl) diphosphite, tetra(C12 to C15 mixed alkyl)-4,4'-isopropylidenediphenyl diphosphite, 4,4'-isopropylidenebis(2-t-butylphenyl)-di(nonylphenyl) phosphite, tris(biphenyl) phosphite, tetra(tridecyl)-1,1,3-tris(2-methyl-5-t-butyl-4-hydroxyphenyl)butane diphosphite, tetra(tridecyl)-4,4'-butylidenebis(3-methyl-6-t-butylphenyl)diphosphite, tetra (C1 to 015 mixed alkyl)-4,4'-isopropylidenediphenyl diphosphite, tris(mono-di mixed nonylphenyl)phosphite, 4,4'-isopropylidenebis(2-t-butylphenyl)-di(nonylphenyl) phosphite, 9,10-di-hydro-9-oxa-9-oxa-10-phosphorphenanthrene-10-oxide, tris(3,5-di-t-butyl-4-hydroxyphenyl)phosphite, hydrogenated-4,4'-isopropylidenediphenyl polyphosphite, bis(octylphenyl)-(4,4'-butylidenebis(3-methyl-6-t-butylphenyl)-1,6-hexanol diphosphite, hexamidecyl-1,1,3-tris(2-methyl-4-hydroxy-5-t-butylphenyl) diphosphite, tris(4,4'-isopropylidenebis(2-t-butylphenyl) phosphite, tris(1,3-stearoyloxyisopropyl)phosphite, 2,2-methylenebis(4,6-di-t-butylphenyl)octyl phosphite, 2,2-methylenebis(3-methyl-4,6-di-t-butylphenyl)-2-ethylhexyl phosphite, tetrakis(2,4-di-t-butyl-5-methylphenyl)-4,4'-biphenylene diphosphite, and tetrakis(2,4-di-t-butylphenyl)-4, 4'-biphenylene diphosphite. As a phosphorous-based thermal stabilizer, one kind may be used, or two or more kinds may be used in combination.

Of those cited above, from the perspectives of further improvement of the thermal aging resistance of the copolymer polyamide composition and the reduction of the amount of generated gas, pentaerythritol type phosphite compounds and/or tris(2,4-di-t-butylphenyl)phosphite is preferably used. Examples of pentaerythritol type phosphite compounds include, but not limited to, 2,6-di-t-butyl-4-methylphenyl-phenyl-pentaerythritol diphosphite, 2,6-di-t-butyl-4-methylphenyl-methyl-pentaerythritol diphosphite, 2,6-di-t-butyl-4-methylphenyl-2-ethylhexyl-pentaerythritol diphosphite, 2,6-di-t-butyl-4-methylphenyl-isodecyl-pentaerythritol diphosphite, 2,6-di-t-butyl-4-methylphenyl-lauryl-pentaerythritol diphosphite, 2,6-di-t-butyl-4-methylphenyl-isotridecyl-pentaerythritol diphosphite, 2,6-di-t-butyl-4-methylphenyl-stearyl-pentaerythritol diphosphite, 2,6-di-t-butyl-4-methylphenyl-cyclohexyl-pentaerythritol diphosphite, 2,6-di-t-butyl-4-methylphenyl-benzyl-pentaerythritol diphosphite, 2,6-di-t-butyl-4-methylphenyl-ethylcellosolve-pentaerythritol diphosphite, 2,6-di-t-butyl-4-methylphenyl-butylcarbitol-pentaerythritol diphosphite, 2,6-di-t-butyl-4-methylphenyl-octylphenyl-pentaerythritol diphosphite, 2,6-di-t-butyl-4-methylphenyl-nonylphenyl-pentaerythritol diphosphite, bis(2,6-di-t-butyl-4-methylphenyl)pentaerythritol diphosphite, bis(2,6-di-t-butyl-4-ethylphenyl)pentaerythritol diphosphite, 2,6-di-t-butyl-4-methylphenyl-2,6-di-t-butylphenyl-pentaerythritol diphosphite, 2,6-di-t-butyl-4-methylphenyl-2,4-di-t-butylphenyl-pentaerythritol diphosphite, 2,6-di-t-butyl-4-methylphenyl-2,4-di-t-octylphenyl-pentaerythritol diphosphite, 2,6-di-t-butyl-4-methylphenyl-2-cyclohexylphenyl-pentaerythritol diphosphite, 2,6-di-t-amyl-4-methylphenyl-phenyl-pentaerythritol diphosphite, bis(2,6-di-t-amyl-4-methylphenyl)pentaerythritol diphosphite, and bis(2,6-di-t-octyl-4-methylphenyl)pentaerythritol diphosphite. As a pentaerythritol type phosphite compound, one kind may be used, or two or more kinds may be used in combination.

Of these pentaerythritol type phosphite compound listed above, one or more of the compounds selected from the group consisting of bis(2,6-di-t-butyl-4-methylphenyl)pentaerythritol diphosphite, bis(2,6-di-t-butyl-4-ethylphenyl)pentaerythritol diphosphite, bis(2,6-di-t-amyl-4-methylphenyl)pentaerythritol diphosphite, and bis(2,6-di-t-octyl-4-methylphenyl)pentaerythritol diphosphite are preferable. Bis(2,6-di-t-butyl-4-methylphenyl)pentaerythritol diphosphite is more preferable.

If a phosphorus-based thermal stabilizer is used, the content of the phosphorus-based thermal stabilizer in the copolymer polyamide composition is preferably 0.01 to 1 part by mass and more preferably 0.1 to 1 part by mass based on 100 parts by mass of the copolymer polyamide composition. If the content of the phosphorus-based thermal stabilizer falls in this range, the thermal aging resistance of the copolymer polyamide composition can be further improved, and the amount of generated gas can be reduced.

Examples of the amine-based thermal stabilizer may include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,ω-bis(2,2,6,6-tetramethyl-4-piperidyloxy)-p-xylene, bis(2,2,6,6-tetramethyl-4-piperidyl)-tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethylpiperidine, and a condensation product of 1,2,3,4-butanetetracarboxylic acid, 1,2,2,6,6-pentamethyl-4-piperidinol, and β,β,β',β'-tetramethyl-3,9-[2,4,8,10-tetraoxaspiro(5,5)undecane]diethanol. As an amine-based thermal stabilizer, one kind may be used, or two or more kinds may be used in combination.

If an amine-based thermal stabilizer is used, the content of the amine-based thermal stabilizer in the copolymer polyamide composition is preferably 0.01 to 1 part by mass and more preferably 0.1 to 1 part by mass based on 100 parts by mass of the copolymer polyamide composition. If the content of the amine-based thermal stabilizer falls in this range, the thermal aging resistance of the copolymer polyamide composition can be further improved, and the amount of generated gas can be reduced.

The metal salts of group 3, 4 and 11 to 14 elements of the periodic table are not especially limited as long as they are salts of metals belonging to these groups. From the perspective of further improvement of the thermal aging resistance of the copolymer polyamide composition, a copper salt is preferably used. Examples of the copper salt are not limited to but include copper halides (such as copper iodide, copper (I) bromide, copper(II) bromide and copper(I) chloride), copper acetate, copper propionate, copper benzoate, copper adipate, copper terephthalate, copper isophthalate, copper salicylate, copper nicotinate, copper stearate, and copper complex salts in which copper is coordinated in a chelating agent such as ethylenediamine or ethylenediaminetetraacetic acid. One of these may be used alone or two or more of them may be used in combination.

Of the copper salts cited above, one or more selected from the group consisting of copper iodide, copper(I) bromide, copper(II) bromide, copper(I) chloride and copper acetate are preferably used, and copper iodide and/or copper acetate is more preferably used. If any of the more preferable copper salts is used, a copolymer polyamide composition which has excellent thermal aging resistance and is capable of effectively suppressing metallic corrosion of a screw or a cylinder caused in extrusion (hereinafter sometimes referred to simply as "metallic corrosion") can be obtained.

If a copper salt is used, the content of the copper salt in the copolymer polyamide composition is preferably 0.01 to 0.60 part by mass and more preferably 0.02 to 0.40 part by mass based on 100 parts by mass of the copolymer polyamide. If the content of the copper salt falls in this range, the thermal aging resistance of the copolymer polyamide composition can be further improved, and in addition, precipitation of copper and the metallic corrosion can be effectively suppressed.

Furthermore, the concentration of a copper element derived from the copper salt is, from the perspective of the improvement of the thermal aging resistance of the copolymer polyamide composition, preferably 10 to 2000 parts by mass, more preferably 30 to 1500 parts by mass and still more preferably 50 to 500 parts by mass based on $10^6$ parts by mass of the copolymer polyamide.

Examples of the halides of alkali metals and alkali earth metals are not limited to but include potassium iodide, potassium bromide, potassium chloride, sodium iodide, sodium chloride and mixtures of any of these. Especially, from the perspectives of the improvement of the thermal aging resistance and the suppression of the metallic corrosion, potassium iodide and/or potassium bromide is preferably used, and potassium iodide is more preferably used.

If a halide of an alkali metal or alkali earth metal is used, the content of the halide of an alkali metal or alkali earth metal in the copolymer polyamide composition is preferably 0.05 to 20 parts by mass and more preferably 0.2 to 10 parts by mass based on 100 parts by mass of the copolymer polyamide. If the content of the halide of the alkali metal or alkali earth metal falls in this range, the thermal aging resistance of the copolymer polyamide composition can be further improved, and in addition, the precipitation of copper and the metallic corrosion can be effectively suppressed.

As for the components of the thermal stabilizers described so far, one of them may be used alone or two or more of them may be used in combination. Especially, from the perspective of further improvement of the thermal aging resistance of the copolymer polyamide composition, a mixture of a copper salt and a halide of an alkali metal or an alkali earth metal is preferably used.

A ratio between the copper salt and the halide of an alkali metal or an alkali earth metal is, in terms of a molar ratio between halogen and copper (halogen/copper), preferably 2/1 to 40/1 and more preferably 5/1 to 30/1. If the ratio falls in this range, the thermal aging resistance of the copolymer polyamide composition can be further improved.

The halogen/copper ratio is preferably 2/1 or more because the precipitation of copper and the metallic corrosion can be effectively suppressed in this case. On the other hand, the halogen/copper ratio is preferably 40/1 or less because the corrosion of a screw and the like of a molding machine can be prevented substantially without deteriorating mechanical properties (such as toughness) in this case.

<Polymer Other than Copolymer Polyamide>

Examples of the polymer other than the copolymer polyamide are not limited to but include polyamide other than the copolymer polyamide, polyester, liquid crystal polyester, polyphenylene sulfide, polyphenylene ether, polycarbonate, polyalylate, a phenol resin and an epoxy resin.

Examples of the polyamide other than the copolymer polyamide include polyamide 66, polyamide 56, polyamide 46, polyamide 610, polyamide 612, polyamide 6T, polyamide 6I, polyamide 6, polyamide 11, polyamide 12 and polyamide MXD6, and homopolymers and copolymers of these.

Examples of the polyester include polybutylene terephthalate, polytrimethylene terephthalate, polyethylene terephthalate and polyethylene naphthalate.

The blend amount of the polymer other than the copolymer polyamide is preferably 1 to 200 parts by mass, more preferably 5 to 100 parts by mass and still more preferably 5 to 50 parts by mass based on 100 parts by mass of the copolymer polyamide. By setting the blend amount of the polymer other than the copolymer polyamide to fall in this range, a copolymer polyamide composition which has excellent heat resistance and releasability can be obtained.

To the extent that the object of the present embodiment is not harmed, the copolymer polyamide composition according to the present embodiment may include additives which are customarily used in polyamides, such as a coloring agent like a pigment or a dye (including a coloring masterbatch), a fire retardant, a fibrillating agent, a fluorescent bleaching agent, a plasticizer, an antioxidant, an ultraviolet absorber, an antistatic agent, a fluidity improving agent, a spreading agent and an elastomer.

If the copolymer polyamide composition according to the present embodiment contains the other materials which can be contained in the copolymer polyamide composition described above, the contents of the other materials depend upon the types of the materials and use application of the polyamide composition, and hence are not especially limited as long as the object of the present embodiment is not harmed.

[Method for Producing Copolymer Polyamide Composition]

A method for producing the copolymer polyamide composition according to the present embodiment is not especially limited as long as it is a production method comprising a step of performing melt kneading of raw material components containing the above-described copolymer polyamide, and for example, a method comprising a step of performing melt kneading of raw material components containing the copolymer polyamide with an extruder whose set temperature is set to the peak melting temperature $T_{pm-1}$ of the copolymer polyamide +30° C. or less is preferably employed.

Examples of a method for performing the melt kneading of the raw material components containing the copolymer polyamide include a method in which the copolymer polyamide and the other materials are mixed by using a tumbler, a Henschel mixer or the like and the resultant mixture is supplied to a melt kneader for kneading, and a method in which the copolymer polyamide turned into a melt state by using a single-screw or double-screw extruder is blended with the other materials supplied from a side feeder.

The method for feeding the components constituting the copolymer polyamide composition to the melt kneader can be carried out by feeding all of the constituent components all at once to the same feed opening, or by feeding from different feed openings for the respective constituent components.

The melt kneading temperature is preferably about 250 to 375° C. at a resin temperature.

The melt kneading time is preferably about 0.25 to 5 minutes.

The apparatus for performing the melt kneading is not especially limited. Known apparatuses, for example, melt kneaders such as a single-screw or twin-screw extruder, a Banbury mixer and a mixing roll may be used.

[Use Application]

A molded product according to the present embodiment contains the above-described copolymer polyamide or the above-described copolymer polyamide composition.

The molded product of the present embodiment can be obtained by molding the copolymer polyamide or the copolymer polyamide composition by any of generally known plastic molding methods such as press molding, injection molding, gas-assisted injection molding, welding molding, extrusion molding, blow molding, film molding, hollow molding, multilayer molding and melt spinning.

The molded product of the present embodiment is obtained from the copolymer polyamide or the copolymer polyamide composition, and therefore, has excellent heat resistance, moldability, mechanical strength, low water absorbance, vibration fatigue characteristics and surface appearance. Accordingly, the molded product of the present embodiment can be suitably used as an automobile component, an electric or electronic component, a household electrical appliance component, an OA equipment component, a mobile equipment component, an industrial equipment component, and various components of daily and household articles, as well as extrusion applications. Especially, the molded product of the present embodiment is preferably used as an automobile component, an electronic component, a household electrical appliance component, an OA equipment component and a mobile equipment component.

Examples of the automobile component are not especially limited, and may include an air intake system component, a cooling system component, a fuel system component, an interior component, an exterior component and an electrical component.

Examples of the automobile air intake system component are not especially limited, and may include an air intake manifold, an intercooler inlet, an exhaust pipe cover, an inner bushing, a bearing retainer, an engine mount, an engine head cover, a resonator, and a slot body.

Examples of the automobile cooling system component are not especially limited, and may include a chain cover, a thermostat housing, an outlet pipe, a radiator tank, an alternator, and a delivery pipe.

Examples of the automobile fuel system component are not especially limited, and may include a fuel delivery pipe and a gasoline tank case.

Examples of the automobile interior system component are not especially limited, and may include an instrument panel, a console box, a glove box, a steering wheel, and a trimming.

Examples of the automobile external component are not especially limited, and may include a molding, a lamp housing, a front grill, a mud guard, a side bumper, a door mirror stay, and a roof rail.

Examples of the automobile electrical component are not especially limited, and may include a connector, a wire harness connector, a motor component, a lamp socket, an on-board sensor switch, and a combination switch.

Examples of the electric and electronic component are not especially limited, and may include a connector, reflector for a light emitting device, a switch, a relay, a printed wiring board, an electronic component housing, a power point, a noise filter, a coil bobbin, and a motor end cap.

Examples of the mobile equipment component are not especially limited and may include housings and structures of mobile phones, smartphones, personal computers, portable video game players and digital cameras.

Examples of the industrial machinery component are not especially limited, and may include a gear, a cam, an insulation block, a valve, a power tool component, an agricultural implement component, and an engine cover.

Examples of the daily and household articles are not especially limited, and may include a button, a food container, and office equipment.

Examples of the extrusion applications are not especially limited, and may include a film, a sheet, a filament, a tube, a rod, and a hollow molded product.

Of these various applications, the molded product of the present embodiment is particularly preferably used as a component that has a thin portion (with a thickness of, for example, 0.5 mm) and is subjected to a heat treatment (for example, an electric/electronic component such as an SMT connector, a reflector for a light emitting device or a switch).

Furthermore, the molded product of the present embodiment has excellent surface appearance, and hence is preferably used as a molded product having a paint film formed on the surface thereof. The method for forming the paint film is not especially limited as long as it is a known method, and for example, a spray method, an electrostatic coating method or the like may be employed. Furthermore, a paint used in painting is not especially limited as long as it is a known paint, and a melamine crosslinking type polyester polyol resin paint, an acrylic urethane-based paint or the like may be used.

EXAMPLES

The present embodiment will now be described in more detail using the following examples and comparative examples. However, the present embodiment is not limited to only these examples.

The raw materials and measurement methods used in the examples and comparative examples are shown below. In the present embodiment, 1 Kg/cm$^2$ means 0.098 MPa.

[Raw Materials]

The following compounds were used in the examples.

<Dicarboxylic Acid>
(1) 1,4-Cyclohexanedicarboxylic acid (CHDC)
Trade name: 1,4-CHDA HP Grade (trans/cis=25/75) (manufactured by Eastman Chemical Company)
(2) Sebacic acid (C10DC)
Trade name: Sebacic acid TA (manufactured by Itoh Oil Chemicals Co., Ltd.)
(3) Dodecanedioic acid (C12DC) (manufactured by Wako Pure Chemical Industries, Ltd.)
(4) Adipic acid (ADA) (manufactured by Wako Pure Chemical Industries, Ltd.)
(5) Isophthalic acid (IPA) (manufactured by Wako Pure Chemical Industries, Ltd.)

<Diamine>
(1) 1,10-Diaminodecane (decamethylene diamine) (C10DA)
Trade name: 1,10-Decanediamine (manufactured by Kokura Synthetic Industries, Ltd.)
(2) 1,12-Diaminododecane (dodecamethylene diamine) (C12DA) (manufactured by Tokyo Chemical Industries Co., Ltd.)
(3) 1,6-Diaminohexane (hexamethylene diamine) (C6DA) (manufactured by Tokyo Chemical Industries Co., Ltd.)
(4) Pentamethylenediamine (C5DA) (manufactured by Aldrich)
(5) Octamethylenediamine (C8DA) (manufactured by Tokyo Chemical Industries Co., Ltd.)
(6) 1,9-Nonamethylenediamine (C9DA) (manufactured by Aldrich)
(7) Undecamethylenediamine (C11DA) (manufactured by Tokyo Chemical Industries Co., Ltd.)

<Lactam and/or Aminocarboxylic Acid>
(1) ε-Caprolactam (CPL) (manufactured by Wako Pure Chemical Industries, Ltd.)
(2) 11-Aminoundecanoic acid (11AU) (manufactured by Aldrich)
(3) 12-Aminododecanoic acid (12AD) (manufactured by Aldrich)

<Inorganic Filler>
(15) Glass fiber (GF), trade name ECS03T275H, average fiber diameter (average particle size) 10 μm (true circular shape), cut length 3 mm, manufactured by Nippon Electric Glass Co., Ltd.

<Copper Compound>
Copper iodide (CuI), trade name Copper iodide (I), manufactured by Wako Pure Chemical Industries, Ltd.
<Metal Halide>
Potassium Iodide (Ki), Trade Name Potassium Iodide, manufactured by Wako Pure Chemical Industries, Ltd.
<Other Components>
Ethylene bis-stearylamide, trade name Armowax EBS, manufactured by Lion Corporation

[Measurement Methods]

(1) Peak Melting Temperature (Melting Point), Crystallization Peak Temperature and Crystallization Enthalpy The peak melting temperature (melting point), the crystallization peak temperature and the crystallization enthalpy of a copolymer polyamide obtained in each of examples and comparative examples were measured by using the Diamond-DSC, manufactured by PERKIN-ELMER Inc., based on JIS-K7121. The measurement was carried out under conditions of a nitrogen atmosphere and increasing the temperature of a specimen of approximately 10 mg from 50° C. to 350° C. at a rate of temperature increase of 20° C./min. An endothermic peak appearing during the temperature increase was taken as a melting peak, and a peak appearing at the highest temperature was taken as a peak melting temperature $T_{pm}$. Subsequently, the temperature was kept at 350° C. for 3 minutes and lowered from 350° C. to 50° at a rate of temperature decrease of 20° C./min. An exothermic peak appearing during the temperature decrease was taken as a crystallization peak, the temperature was taken as a crystallization peak temperature $T_{pc-1}$, and a crystallization peak area was taken as crystallization enthalpy. Subsequently, after keeping the temperature at 50° C. for 3 minutes, the temperature was increased again from 50° C. to 350° C. at a rate of temperature increase of 20° C./min. A peak appearing at the highest temperature during this temperature increase was taken as a peak melting temperature $T_{pm-1}$, and a peak appearing at the lowest temperature was taken as a peak melting temperature $T_{pm-2}$. Furthermore, after keeping the temperature at 350° C. for 3 minutes, the temperature was lowered from 350° C. to 50° C. at a rate of temperature decrease of 50° C./min. A crystallization peak temperature appearing during this temperature decrease was taken as a crystallization peak temperature $T_{pc-2}$.

(2) Glass Transition Temperature

The glass transition temperature of a copolymer polyamide obtained in each of the examples and the comparative examples was measured by using the Diamond-DCS, manufactured by PERKIN-ELMER Inc., based on JIS-K7121. Measurement conditions were as follows. Measurement was carried out under conditions of using liquid nitrogen to rapidly cool a molten sample obtained by melting a specimen with a hot stage (EP80, manufactured by Mettler) to solidify the sample for use as a measurement sample. Using 10 mg of this sample, the temperature was increased to a range of 30 to 350° C. at a rate of temperature increase of 20° C./min, and the glass transition temperature Tg was measured.

(3) Sulfuric Acid Relative Viscosity ηr at 25° C.

The sulfuric acid relative viscosity ηr at 25° C. of a copolymer polyamide obtained in each of the examples and the comparative examples was measured based on JIS-K6920. Specifically, 98% sulfuric acid was used for preparing a 1% concentration solution (at a ratio of (1 g of polyamide)/(100 mL of 98% sulfuric acid)), and the relative viscosity was measured under temperature conditions of 25° C.

(4) Trans Isomer Ratio

The trans isomer ratio in a copolymer polyamide obtained in each of the examples and the comparative examples was obtained as follows.

30 to 40 mg of polyamide was dissolved in 1.2 g of hexafluoroisopropanol deuteride, and the trans isomer ratio was measured using the obtained solution by $^1$H-NMR. For 1,4-cyclohexanedicarboxylic acid, the trans isomer ratio in the copolymer polyamide was determined from the ratio of the peak surface area at 1.98 ppm derived from trans isomers and the peak surface areas at 1.77 ppm and 1.86 ppm derived from cis isomers in the $^1$H-NMR measurement.

(5) Amount of Amino Terminals ([NH$_2$])

The amount of amino terminals bonded to polymer terminals in a copolymer polyamide obtained in each of the examples and the comparative examples was measured by the neutralization titration as follows:

A solution obtained by dissolving 3.0 g of polyamide in 100 mL of a 90 mass % phenol aqueous solution was used for titration with 0.025 N hydrochloric acid, so as to obtain the amount (μ equivalent/g) of amino terminals. The end point was determined in accordance with an indicated value of a pH meter.

(6) Amount of Carboxyl Terminals ([COOH])

The amount of carboxyl terminals bonded to polymer terminals in a copolymer polyamide obtained in each of the examples and the comparative examples was measured by the neutralization titration as follows:

A solution obtained by dissolving 4.0 g of polyamide in 50 mL of benzyl alcohol was used for titration with 0.1 N NaOH, so as to obtain the amount (μ equivalent/g) of carboxyl terminals. The end point was determined in accordance with change in color of a phenolphthalein indicator.

(7) Ratio Between the Number of Carbon Atoms and the Number of Amide Groups (the Carbon Atom Number/the Amide Group Number)

An average value of the number of carbon atoms per amide group (the carbon atom number/the amide group number) was obtained by calculation in a copolymer polyamide obtained in each of the examples and the comparative examples. Specifically, a ratio between the number of carbon atoms and the number of amide groups (the carbon atom number/the amide group number) was obtained by dividing the number of carbon atoms contained in a molecular main chain by the number of amide groups contained in the molecular main chain. The ratio between the number of carbon atoms and the number of amide groups (the carbon atom number/the amide group number) was used as an index corresponding to an amino group concentration in the copolymer polyamide.

(8) Biomass Plastic Ratio

In a copolymer polyamide obtained in each of the examples and the comparative examples, the mass % of units constituted by raw materials derived biomass was calculated as a biomass plastic ratio. Specifically, sebacic acid, 1,10-diaminodecane and 11-aminoundecanoic acid obtained from castor oil used as a raw material, and pentamethylenediamine obtained from glucose used as a raw material were regarded as the raw materials derived biomass. In a copolymer polyamide obtained in each of the examples and the comparative examples, a ratio of the units derived from sebacic acid and 1,10-diaminodecane was calculated, and this ratio was taken as the biomass plastic ratio. Incidentally, the calculation was conducted in considering that two hydrogen atoms of a diamine, two oxygen atoms of a dicarboxylic acid and two hydrogen atoms together produce 2 moles of water molecules in formation of an amide bond in the polymerization of a polyamide.

(9) Tensile Strength

Pellets of a copolymer polyamide obtained in each of the examples and the comparative examples were molded into a molded piece of multipurpose test specimen type A based on ISO 3167 by using an injection molding machine [PS-40E; manufactured by Nissei Plastic Industrial Co., Ltd.]. Specifically, the molding was conducted under conditions of injection+holding time of 25 seconds, cooling time of 15 seconds, a die temperature of 80° C. and a melt resin temperature set to the peak melting temperature ($T_{pm-1}$) obtained at the higher temperature of the copolymer polyamide+20° C.

The thus obtained molded piece of multipurpose test specimen type A was subjected to a tensile test based on ISO 527 at 23° C. and a tension speed of 50 mm/min, so as to measure tensile yield stress, which was taken as the tensile strength. Furthermore, the tensile strength at 120° C. was measured in the same manner except that the tensile test was conducted at 120° C.

(10) Water Absorbance

The pre-testing mass (mass before water absorbance) of the molded piece of multipurpose test specimen type A molded as described in the item (9) above was measured in a post-molding dry state (dry as mold) attained after the molding of the molded piece of multipurpose test specimen type A. Then, the molded piece of multipurpose test specimen type A was dipped in 80° C. pure water for 72 hours. The molded piece of multipurpose test specimen type A was then removed from the water, and moisture adhering to the surface was wiped off. The test piece was then left for 30 minutes under a constant-temperature constant-humidity (23° C., 50 RH %) atmosphere, and the post-molding mass (mass after water absorbance). The increase in the mass after water absorbance compared with the mass before water absorbance was taken as the water absorbance amount. The average ratio of the water absorbance amount with respect to the mass before water absorbance for the number of test runs n=3 was taken as the water absorbance.

(11) Blocking Properties

Pellets of a copolymer polyamide obtained in each of the examples and the comparative examples were subjected to melt kneading by using a double-screw extruder [ZSK-26MC; manufactured by Coperion GmbH (Germany)] having L/D (the length of a cylinder of the extruder/the diameter of the cylinder of the extruder)=48 (the number of barrels: 12) with a temperature from an upstream feed opening to a die of the extruder set to 340° C., at a screw revolution speed of 200 rpm and an output rate of 25 kg/h. A strand in a length of 1.5 m extruded from the die was dipped in a water bath at 20° C. and then cut with a strand cutter into pellets. Here, the dipping time in the water bath was set to about 2 seconds. Five kg of the thus obtained pellets were introduced into a stainless steel funnel with an angle of 45 degrees, an inlet diameter of 500 mm and an outlet diameter of 50 mm, so as to measure a ratio of the polyamide pellets blocking one another and remaining in an upper portion of the funnel.

(12) Release Properties

From a copolymer polyamide obtained in each of the examples and the comparative examples, a molded piece with a length of 128 mm, a width of 12.8 mm and a thickness of 0.75 mm was molded by using the injection molding machine [PS-40E; manufactured by Nissei Plastic Industrial Co., Ltd.] used in the item (9) above with injection+holding time set to 5 seconds, a die temperature set to the same temperature as the Tg of the copolymer polyamide, and a melt resin temperature set to the peak melting temperature ($T_{pm-1}$) obtained at the higher temperature of the copolymer polyamide+20° C. Cooling time was controlled, so that the shortest cooling time at which a molded product was smoothly released from a die could be evaluated as the releasability. Reduction of the cooling time leads to improvement of the productivity.

(13) Evaluation of Plasticizing Time Stability

Pellets of a copolymer polyamide obtained in each of the examples and the comparative examples were molded into a molded piece of multipurpose test specimen type A based on ISO 3167 by using an injection molding machine [PS-40E; manufactured by Nissei Plastic Industrial Co., Ltd.]. Specifically, the molding was conducted under conditions of injection+holding time of 25 seconds, cooling time of 15 seconds, a die temperature of 120° C. and a melt resin temperature set to the peak melting temperature ($T_{pm-1}$) obtained at the higher temperature of the copolymer polyamide+20° C. The molding was performed by 1000 shots, so as to obtain ISO test specimens.

In each shot of the injection molding, time elapsed until a pellet of the copolymer polyamide plasticized (hereinafter also referred to as the "plasticizing time") was measured. On the basis of the thus measured values, plasticizing time stability (standard deviation) was obtained in accordance with the following expression:

$$\text{Plasticizing time stability (standard deviation)} = \sqrt{\frac{1}{n}\sum_{i=1}^{n}(Ai - X1)^2} \quad \text{[Expression 1]}$$

$$X1 = \frac{1}{n}\sum_{i=1}^{n}Ai$$

Ai=plasticizing time of each of 1000 shots

X1=arithmetic mean of plasticizing times of 1000 shots

As the standard deviation (a) was smaller, the copolymer polyamide was evaluated to be more excellent in the plasticizing time stability.

(14) Vibration Fatigue Characteristics: Breaking Stress (MPa)

The breaking stress (MPa) was measured by using a dumbbell injection molding test specimen (3 mm thick) for ASTM tensile testing based on ASTM D638. The dumbbell injection molding test specimen was molded from pellets of a copolymer polyamide composition obtained in each of the examples and the comparative examples as follows. A dumbbell test specimen (3 mm thick) die (die temperature=Tg+20° C.) for ASTM tensile testing (ASTM D638) was mounted on an injection molding machine (PS40E, manufactured by Nissei Plastic Industrial Co., Ltd.), and molding was conducted at a cylinder temperature of ($T_{pm-1}$+10)° C. to ($T_{pm-1}$+30)° C., so as to obtain the dumbbell injection molding test specimen from the pellets of the copolymer polyamide composition. The thus obtained dumbbell injection molding test specimen (3 mm thick) for ASTM tensile testing was loaded with a tension load by a sinusoidal wave of a frequency of 20 Hz under a 120° C. atmosphere using a hydraulic servo fatigue testing machine EHF-50-10-3, manufactured by Saginomiya Seisakusho Co., Ltd., to determine the breaking stress (MPa) at 100,000 times. As the thus obtained breaking stress (MPa) was larger, the copolymer polyamide composition was evaluated to be more excellent in the vibration fatigue characteristics.

(15) Surface Appearance (Gloss at 60°)

A flat plate molded piece was produced from pellets of a copolymer polyamide composition obtained in each of the examples and the comparative examples as follows. An injection molding machine [FN-3000; manufactured by Nissei Plastic Industrial Co., Ltd.] was used with cooling time set to 25 seconds, a screw revolution speed set to 200 rpm, a die temperature set to Tg+20° C. and a cylinder temperature set to $(T_{pm-1}+10)$° C. to $(T_{pm-}+30)$° C., and the injection pressure and the injection speed were appropriately adjusted so as to attain injection time of 1.0±0.1 sec, and thus, a flat plate molded piece (13 cm×13 cm, 3 mm thick) was produced from the copolymer polyamide composition pellets. The gloss at 60° was measured in a center portion of the thus produced flat plate molded piece by using a gloss meter (IG320 manufactured by HORIBA Ltd.) based on JIS-K7150. As the measured value was larger, the copolymer polyamide composition was evaluated to be more excellent in the surface appearance.

(16) Continuous Productivity: the Number of Foreign Particles Due to Die-Lip Buildup (/5 kg)

Five kg of pellets of a copolymer polyamide composition obtained in each of the examples and the comparative examples were scattered over a metal vat, so as to visually measure the number of foreign particles due to die-lip buildup (/5 kg). The thus measured value was used as an index corresponding to continuous productivity (molding processability). Specifically, as the number of foreign particles due to die-lip buildup (/5 kg) was smaller, the copolymer polyamide composition was evaluated to be more excellent in the continuous productivity.

(17) Copper Concentration, Halogen Concentration and a Molar Ratio Between Halogen and Copper (Halogen/Cu)

In a copolymer polyamide composition obtained in each of the examples and the comparative examples, a copper concentration, a halogen concentration and a molar ratio between halogen and copper (halogen/Cu) were measured as follows.

The copper concentration was quantified by charging sulfuric acid into a specimen, adding nitric acid to the resultant mixture while heating to dissolve the organic component, maintaining the volume of the solution constant with pure water, and quantifying the concentration by ICP emission analysis (high-frequency plasma emission analysis). A Vista-Pro manufactured by Seiko Instruments & Electronics Ltd. was used for the ICP emission analysis apparatus.

The halogen concentration was quantified by, using iodine as an example, combusting a specimen in a flask purged with high-purity oxygen, trapping the produced gas in an absorbing solution, and quantifying the iodine in the trapped solution using potentiometric titration with a $\frac{1}{100}$ N silver nitrate solution.

The molar ratio of halogen and copper (halogen/Cu) was calculated using the above respective quantified values from the molecular weights converted into moles.

(18) Strength Half-Life (Days)

The strength half-life (days) of a copolymer polyamide composition obtained in each of the examples and the comparative examples was measured as follows.

The dumbbell injection molding test piece (3 mm thick) for ASTM tensile testing described in the above item (14) was heat treated for a predetermined period in a hot-air oven at 200° C., and the tensile strength was measured based on ASTM-D638. Then, the tensile strength after the heat treatment as compared with the tensile strength before the heat treatment was calculated as the tensile strength retention rate. The length of time at which the tensile strength retention rate was 50% was taken as the strength half-life.

(19) Tensile Strength Retention Rate After Dipping (%)

The tensile strength retention rate (%) after dipping of a copolymer polyamide composition obtained in each of the examples and the comparative examples was measured as follows. The dumbbell injection molding test specimen (3 mm thick) for the ASTM tensile testing used in the item (14) above was dipped for 24 hours or 720 hours in a 120° C. aqueous solution of 50% ethylene glycol. After leaving at room temperature, the tensile test of the above item (9) was carried out to measure tensile strength. A tensile strength retention rate after dipping was obtained as a rate of the tensile strength measured after dipping of 720 hours to the tensile strength measured after dipping of 24 hours.

The examples and the comparative examples of the copolymer polyamide will now be described. The measurement items measured as above are also described.

Example 1

A polyamide polymerization reaction was carried out by "hot melt polymerization" as follows.

500 g (2.90 mol) of (a) CHDC, 720 g (4.18 mol) of (b) C10DA, and 300 g (1.30 mol) of (c-1) C12DC were dissolved in 1,500 g of distilled water to produce an equimolar about 50 mass % uniform aqueous solution of the raw material monomers.

The obtained aqueous solution and 17 g (0.10 mol) of (b) C10DA were charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen. Heating was continued from a solution temperature of about 50° C. until the pressure in the autoclave tank was, in terms of gauge pressure (in the following, pressure in the tank is always expressed as gauge pressure), about 2.5 kg/cm² (the solution temperature in this system was about 145° C.). While removing water from the system to maintain the pressure in the tank at about 2.5 kg/cm², heating was continued so that the concentration of the aqueous solution was concentrated to about 75 mass % (the solution temperature in this system was about 160° C.). Removal of water was stopped, and then heating was continued until the pressure in the tank was about 30 kg/cm² (the solution temperature in this system was about 245° C.). While removing water from the system to maintain the pressure in the tank at about 30 kg/cm², heating was continued until 50° C. below (here, 275° C.) the final temperature (325° C., described later). After the solution temperature increased to 50° C. below (here, 275° C.) the final temperature (325° C., described later), while continuing heating, the pressure in the tank was lowered over about 120 minutes to atmospheric pressure (gauge pressure of 0 kg/cm²).

Subsequently, the heater temperature was adjusted so that the final temperature of the resin temperature (solution temperature) would be about 325° C. With the resin temperature at about 325° C., the tank contents were kept for 30 minutes under a reduced pressure of about 53.3 kPa (400 Torr) by a vacuum apparatus to obtain a polymer. Then, the pressure was increased with nitrogen, and the resin was formed into a strand from a lower spinneret (nozzle). This strand was water cooled and cut, then discharged in pellet form to obtain a copolymer polyamide as a pellet.

Measurements were carried out on the physical properties of the obtained copolymer polyamide based on the above-described methods. Table 5 shows the measurement results.

Examples 2 to 26 and Comparative Examples 1 to 7

Polyamide polymerization reaction ("hot melt polymerization") was carried out by the method described in Example 1, except that the compounds and amounts shown in Tables 1 to 4 were used for the (a) alicyclic dicarboxylic acid, (b) diamine having 8 or more carbon atoms, (c) copolymer component, and additives in the melt polymerization, and that the resin final temperature was the temperature shown in Tables 1 to 4 to obtain a copolymer polyamide as a pellet.

Measurements were carried out on the physical properties of the obtained copolymer polyamide based on the above-described methods. Tables 5 to 8 show the measurement results.

Comparative Example 8

A polyamide polymerization reaction was carried out by the "hot melt polymerization" as follows.

The polymerization was conducted in accordance with a method described in Patent Document 7 (Japanese Patent Publication No. 64-2131) mentioned above.

An equimolar approximately 50 mass % uniform aqueous solution of raw material monomers was prepared by dissolving 750 g (4.36 mol) of (a) CHDC, 600 g (3.48 mol) of (b) C10DA and 100 g (0.86 mol) of (c-2) C6DA in 1500 g of distilled water.

The obtained aqueous solution was charged into an autoclave having an internal volume of 5.4 L (manufactured by Nitto Kouatsu Co., Ltd.), the autoclave was kept warm until the solution temperature (internal temperature) was 50° C., and then the contents of the autoclave were purged with nitrogen. Heating was continued from a solution temperature of about 50° C. to 210° C., and the heating was continued while removing water from the system to maintain the pressure in the autoclave tank, in terms of gauge pressure (in the following, pressure in the tank is always expressed as gauge pressure), at 17.5 kg/cm². Thereafter, the internal temperature was increased to 345° C., and the pressure in the tank was lowered over about 120 minutes to atmospheric pressure (gauge pressure of 0 kg/cm²). Subsequently, a nitrogen gas was allowed to flow through the tank for 30 minutes, the heater temperature was adjusted so that the final temperature of the resin temperature (solution temperature) would be about 350° C., so as to obtain a polymer. Then, the pressure was increased with nitrogen, so as to form the obtained polymer into a strand from a lower spinneret (nozzle). The strand was water cooled and cut, so as to be discharged in the form of pellets. Thus, the pellets of a copolymer polyamide were obtained.

The respective properties of the obtained copolymer polyamide were measured in accordance with the aforementioned measurement methods. Table 8 shows the measurement results.

Comparative Example 9

A polyamide polymerization reaction was carried out by "prepolymer/solid phase polymerization" as follows.

The polymerization was conducted in accordance with a method described in Patent Document 8 (WO 2008/149862) mentioned above.

An equimolar approximately 50 mass % uniform aqueous solution of raw material monomers was prepared by dissolving 726 g (4.22 mol) of (a) CHDC, 675 g (3.37 mol) of (b) C12DA and 99 g (0.85 mol) of (c-2) C6DA in 1500 g of distilled water.

The obtained aqueous solution was charged into an autoclave having an internal volume of 5.4 L (manufactured by Nitto Kouatsu Co., Ltd.), the autoclave was kept warm until the solution temperature (internal temperature) was 50° C., and then the contents of the autoclave were purged with nitrogen.

The solution within the autoclave was stirred, and the internal temperature was increased to 160° C. over 50 minutes. The internal temperature was maintained at 160° C. for 30 minutes, and heating was continued while removing water vapor from the autoclave, so that the aqueous solution could be concentrated to a concentration of about 70 mass %. After stopping the removal of water, heating was continued until the pressure in the tank was about 35 kg/cm² (the solution temperature in this system was about 250° C.). While removing water from the system to maintain the pressure in the tank at about 35 kg/cm², the reaction was conducted for 1 hour until the final temperature was 300° C., so as to obtain a prepolymer.

The prepolymer was crushed into a size of 3 mm or less, and the crushed prepolymer was dried at 100° C. for 24 hours under an atmosphere of a nitrogen gas flowed at a flow rate of 20 L/min. Thereafter, solid phase polymerization of the prepolymer was carried out at 280° for 10 hours under an atmosphere of a nitrogen gas flowed at a flow rate of 200 mL/min, so as to obtain a polyamide. Table 4 shows the composition and polymerization conditions of this polyamide. Furthermore, the respective properties of the obtained polyamide were measured in accordance with the aforementioned methods. Table 8 shows the measurement results.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Constituent components of copolymer polyamide | (a) Alicyclic dicarboxylic acid | Type | CHDC | CHDC | CHDC | CHDC | CHDC | CHDC | CHDC | CHDC | CHDC |
| | | g | 500 | 650 | 650 | 600 | 487 | 630 | 622 | 609 | 575 |
| | | mol | 2.90 | 3.78 | 3.78 | 3.48 | 2.83 | 3.60 | 3.60 | 3.54 | 3.34 |
| | (b) Diamine having 8 or more carbon atoms | Type | C10DA | C10DA | C10DA | C10DA | C10DA | C10DA | C10DA | C10DA | C8DA |
| | | g | 720 | 720 | 720 | 753 | 755 | 630 | 622 | 609 | 688 |
| | | mol | 4.18 | 4.18 | 4.18 | 4.37 | 4.38 | 3.60 | 3.60 | 3.54 | 4.77 |
| | (c-1) Dicarboxylic acid other than alicyclic dicarboxylic acid | Type | C12DC | C12DC | C10DC | IPA | IPA | ADA | IPA | C10DC | IPA |
| | | g | 300 | 95 | 85 | 147 | 258 | 134 | 150 | 179 | 2.38 |
| | | mol | 1.30 | 0.41 | 0.42 | 0.89 | 1.55 | 0.92 | 0.90 | 0.89 | 1.43 |

TABLE 1-continued

|  |  |  | Example 1 | Example 2 | Example 3 | Example 4 | Example 5 | Example 6 | Example 7 | Example 8 | Example 9 |
|---|---|---|---|---|---|---|---|---|---|---|---|
|  | (c-2) Diamine having fewer carbon atoms than (b) diamine | Type<br>g<br>mol |  |  |  |  |  | C6DA<br>106<br>0.92 | C6DA<br>105<br>0.90 | C6DA<br>103<br>0.89 |  |
|  | (c-3) Lactam and/or aminocarboxylic acid | Type<br>g<br>mol |  |  |  |  |  |  |  |  |  |
|  | Component added in polymerization | Type<br>g<br>mol | C10DA<br>17<br>0.10 | C10DA<br>17<br>0.10 | C10DA<br>17<br>0.10 | C10DA<br>17<br>0.10 | C10DA<br>17<br>0.10 | C10DA<br>17<br>0.10 | C10DA<br>17<br>0.10 | C10DA<br>17<br>0.10 | C8DA<br>14<br>0.10 |
|  | Blend ratio of (c) copolymer component | mol % | 16 | 5 | 5 | 10 | 18 | 11 | 11 | 11 | 15 |
| Polymerization conditions | Polymerization method |  | Hot melt | Hot melt | Hot melt | Hot melt | Hot melt | Hot melt | Hot melt | Hot melt | Hot melt |
|  | Final temperature of hot melt polymerization | °C. | 325 | 350 | 355 | 340 | 325 | 315 | 325 | 330 | 335 |

TABLE 2

|  |  |  | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|
| Constituent components of copolymer polyamide | (a) Alicyclic dicarboxylic acid | Type<br>g<br>mol | CHDC<br>750<br>4.36 | CHDC<br>750<br>4.36 | CHDC<br>750<br>4.36 | CHDC<br>750<br>4.36 | CHDC<br>750<br>4.36 | CHDC<br>750<br>4.36 | CHDC<br>750<br>4.36 | CHDC<br>750<br>4.36 | CHDC<br>782<br>4.54 | CHDC<br>726<br>4.22 | CHDC<br>704<br>4.09 |
|  | (b) Diamine having 8 or more carbon atoms | Type<br>g<br>mol | C10DA<br>680<br>3.95 | C10DA<br>600<br>3.48 | C10DA<br>525<br>3.05 | C10DA<br>490<br>2.84 | C10DA<br>490<br>2.84 | C10DA<br>490<br>2.84 | C10DA<br>455<br>2.64 | C10DA<br>375<br>2.18 | C10DA<br>625<br>3.63 | C12DA<br>675<br>3.37 | C12DA<br>656<br>3.28 |
|  | (c-1) Dicarboxylic acid other than alicyclic dicarboxylic acid | Type<br>g<br>mol |  |  |  |  |  |  |  |  |  |  |  |
|  | (c-2) Diamine having fewer carbon atoms than (b) diamine | Type<br>g<br>mol | C6DA<br>50<br>0.43 | C6DA<br>100<br>0.86 | C6DA<br>150<br>1.29 | C6DA<br>175<br>1.52 | C6DA<br>175<br>1.52 | C6DA<br>175<br>1.52 | C6DA<br>200<br>1.72 | C6DA<br>255<br>2.19 | C5DA<br>93<br>0.91 | C6DA<br>99<br>0.85 | C10DA<br>140<br>0.81 |
|  | (c-3) Lactam and/or aminocarboxylic acid | Type<br>g<br>mol |  |  |  |  |  |  |  |  |  |  |  |
|  | Component added in polymerization | Type<br>g<br>mol | C10DA<br>17<br>0.10 | C10DA<br>17<br>0.10 | C10DA<br>17<br>0.10 | C10DA<br>17<br>0.10 | C10DA<br>0<br>0.00 | C10DA<br>26<br>0.15 | C10DA<br>17<br>0.10 | C10DA<br>17<br>0.10 | C10DA<br>17<br>0.10 | C12DA<br>20<br>0.10 | C12DA<br>20<br>0.10 |
|  | Blend ratio of (c) copolymer component | mol % | 5 | 10 | 15 | 17 | 17 | 17 | 20 | 25 | 10 | 10 | 10 |
| Polymerization conditions | Polymerization method |  | Hot melt | Hot melt | Hot melt | Hot melt | Hot melt | Hot melt | Hot melt | Hot melt | Hot melt | Hot melt | Hot melt |
|  | Final temperature of hot melt polymerization | °C. | 350 | 350 | 340 | 340 | 340 | 340 | 340 | 345 | 335 | 330 | 350 |

TABLE 3

|  |  |  | Example 21 | Example 22 | Example 23 | Example 24 | Example 25 | Example 26 |
|---|---|---|---|---|---|---|---|---|
| Constituent components of copolymer | (a) Alicyclic dicarboxylic acid | Type<br>g<br>mol | CHDC<br>700<br>4.06 | CHDC<br>700<br>4.06 | CHDC<br>700<br>4.06 | CHDC<br>775<br>4.50 | CHDC<br>750<br>4.36 | CHDC<br>622<br>3.60 |
|  | (b) Diamine having 8 or more carbon atoms | Type<br>g<br>mol | C10DA<br>700<br>4.06 | C10DA<br>700<br>4.06 | C10DA<br>700<br>4.06 | C8DA<br>650<br>4.50 | C10DA<br>600<br>3.48 | C10DA<br>622<br>3.60 |
|  | (c-1) Dicarboxylic acid other than alicyclic dicarboxylic acid | Type<br>g<br>mol |  |  |  |  |  | IPA<br>150<br>0.90 |
|  | (c-2) Diamine having fewer carbon atoms than (b) diamine | Type<br>g<br>mol |  |  |  |  | C6DA<br>100<br>0.88 | C6DA<br>105<br>0.90 |
|  | (c-3) Lactam and/or aminocarboxylic acid | Type<br>g<br>mol | CPL<br>51<br>0.45 | 11AU<br>145<br>0.72 | 12AD<br>155<br>0.72 | 12AD<br>172<br>0.80 | CPL<br>28<br>0.25 | CPL<br>28<br>0.25 |

TABLE 3-continued

|  |  |  | Example 21 | Example 22 | Example 23 | Example 24 | Example 25 | Example 26 |
|---|---|---|---|---|---|---|---|---|
|  | Component added in polymerization | Type | C10DA | C10DA | C10DA | C8DA | C10DA | C10DA |
|  |  | g | 17 | 17 | 17 | 14 | 17 | 17 |
|  |  | mol | 0.10 | 0.10 | 0.10 | 0.10 | 0.10 | 0.10 |
|  | Blend ratio of (c) copolymer component | mol % | 5 | 8 | 8 | 8 | 13 | 22 |
| Polymerization conditions | Polymerization method |  | Hot melt | Hot melt | Hot melt | Hot melt | Hot melt | Hot melt |
|  | Final temperature of hot melt polymerization | ° C. | 350 | 325 | 340 | 345 | 340 | 315 |

TABLE 4

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Constituent components of copolymer polyamide | (a) Alicyclic dicarboxylic acid | Type | CHDC | CHDC | CHDC | CHDC | CHDC | CHDC | CHDC | CHDC | CHDC |
|  |  | g | 782 | 750 | 780 | 750 | 765 | 639 | 589 | 750 | 726 |
|  |  | mol | 4.54 | 4.35 | 4.35 | 4.18 | 4.44 | 3.71 | 3.42 | 4.36 | 4.22 |
|  | (b) Diamine having 8 or more carbon atoms | Type | C9DA | C10DA | C11DA | C11DA | C11DA | C8DA | C12DA | C10DA | C12DA |
|  |  | g | 718 | 750 | 720 | 650 | 579 | 536 | 686 | 600 | 675 |
|  |  | mol | 4.54 | 4.35 | 4.18 | 3.49 | 3.11 | 3.71 | 3.42 | 3.48 | 3.37 |
|  | (c-1) Dicarboxylic acid other than alicyclic dicarboxylic acid | Type |  |  |  |  |  | ADA | ADA |  |  |
|  |  | g |  |  |  |  |  | 181 | 125 |  |  |
|  |  | mol |  |  |  |  |  | 1.24 | 0.86 |  |  |
|  | (c-2) Diamine having fewer carbon atoms than (b) diamine | Type |  |  |  | C6DA | C6DA | C6DA | C6DA | C6DA | C6DA |
|  |  | g |  |  |  | 101 | 155 | 144 | 100 | 100 | 99 |
|  |  | mol |  |  |  | 0.86 | 1.33 | 1.24 | 0.86 | 0.86 | 0.85 |
|  | (c-3) Lactam and/or aminocarboxylic acid | Type |  |  |  |  |  |  | CPL |  |  |
|  |  | g |  |  |  |  |  |  | 28 |  |  |
|  |  | mol |  |  |  |  |  |  | 0.25 |  |  |
|  | Component added in polymerization | Type | C9DA | C10DA | C11DA | C11DA | C11DA | C8DA | C12DA | C10DA | C12DA |
|  |  | g | 16 | 17 | 19 | 19 | 19 | 14 | 20 | 17 | 20 |
|  |  | mol | 0.10 | 0.10 | 0.10 | 0.10 | 0.10 | 0.10 | 0.10 | 0.10 | 0.10 |
|  | Blend ratio of (c) copolymer component | mol % | 0 | 0 | 0 | 10 | 15 | 25 | 22 | 10 | 10 |
| Polymerization conditions | Polymerization method |  | Hot melt | Hot melt | Hot melt | Hot melt | Hot melt | Hot melt | Hot melt | Hot melt | Prepolymer + solid phase |
|  | Final temperature of hot melt polymerization | ° C. | 335 | 360 | 330 | 310 | 325 | 340 | 305 | 350 | 300 |

TABLE 5

|  |  | Example 1 | Example 2 | Example 3 | Example 4 | Example 5 | Example 6 | Example 7 | Example 8 | Example 9 |
|---|---|---|---|---|---|---|---|---|---|---|
| Trans isomer ratio | mol % | 70 | 70 | 71 | 70 | 70 | 71 | 70 | 70 | 70 |
| Peak melting temperature Tpm-1 | ° C. | 300 | 326 | 328 | 317 | 298 | 292 | 302 | 307 | 311 |
| Peak melting temperature Tpm-2 | ° C. | 283 | 298 | 298 | 300 | 283 | 276 | 288 | 290 | 295 |
| Difference between Tpm and Tpm-1 | ° C. | 3 | 4 | 2 | 2 | 5 | 3 | 3 | 6 | 4 |
| Difference between Tpm-1 and Tpm-2 | ° C. | 17 | 28 | 30 | 17 | 15 | 16 | 14 | 17 | 16 |
| Crystallization peak temperature Tpc-1 in decreasing temperature at 20° C./min | ° C. | 263 | 288 | 288 | 274 | 255 | 261 | 271 | 269 | 281 |
| Crystallization peak temperature Tpc-2 in decreasing temperature at 50° C./min | ° C. | 247 | 275 | 275 | 265 | 245 | 246 | 259 | 259 | 271 |
| Difference between Tpc-1 and Tpc-2 | ° C. | 16 | 13 | 13 | 9 | 10 | 15 | 12 | 10 | 10 |
| Crystallization enthalpy in decreasing temperature at 20° C./min | J/g | 19 | 32 | 24 | 36 | 33 | 33 | 33 | 34 | 45 |
| Glass transition temperature Tg | ° C. | 92 | 98 | 95 | 109 | 103 | 109 | 117 | 94 | 131 |
| Difference between Tpc-1 and Tg | ° C. | 171 | 190 | 193 | 165 | 152 | 152 | 154 | 175 | 150 |
| Sulfuric acid relative viscosity ηr at 25° C. |  | 2.2 | 2.2 | 2.2 | 2.2 | 2.2 | 2.2 | 2.2 | 2.2 | 2.2 |
| [NH2]/([NH2] + [COOH]) |  | 0.66 | 0.67 | 0.64 | 0.58 | 0.65 | 0.55 | 0.56 | 0.60 | 0.52 |
| Carbon atom number/amide group number |  | 9.6 | 9.2 | 9.1 | 9.0 | 9.0 | 8.4 | 8.6 | 8.8 | 8.0 |

TABLE 5-continued

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Biomass plastic ratio |  | % | 70 | 54 | 60 | 55 | 55 | 44 | 44 | 56 | 0 |
| Properties of copolymer polyamide | Tensile strength at 23° C. | MPa | 80 | 85 | 85 | 87 | 91 | 85 | 88 | 82 | 95 |
|  | Tensile strength at 120° C. | MPa | 41 | 44 | 44 | 54 | 51 | 50 | 52 | 50 | 61 |
|  | Water absorbance | % | 2.1 | 2.2 | 2.3 | 2.0 | 1.7 | 2.6 | 2.4 | 2.2 | 3.3 |
|  | Blocking properties | % | 5 | 5 | 5 | 0 | 0 | 0 | 0 | 0 | 0 |
|  | Releasability | sec | 8 | 3 | 3 | 3 | 3 | 3 | 3 | 3 | 3 |
|  | Plasticizing time stability |  | 0.21 | 0.18 | 0.23 | 0.21 | 0.19 | 0.22 | 0.21 | 0.25 | 0.22 |

TABLE 6

|  |  | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Trans isomer ratio | mol % | 71 | 71 | 70 | 70 | 70 | 70 | 70 | 71 | 70 | 70 | 70 |
| Peak melting temperature Tpm-1 | ° C. | 326 | 327 | 312 | 313 | 313 | 313 | 313 | 322 | 311 | 308 | 328 |
| Peak melting temperature Tpm-2 | ° C. | 300 | 306 | 298 | 300 | 300 | 300 | 288 | 311 | 286 | 273 | 297 |
| Difference between Tpm and Tpm-1 | ° C. | 4 | 5 | 4 | 5 | 5 | 5 | 5 | 3 | 5 | 7 | 6 | 3 |
| Difference between Tpm-1 and Tpm-2 | ° C. | 26 | 21 | 14 | 13 | 13 | 13 | 25 | 11 | 25 | 35 | 31 |
| Crystallization peak temperature Tpc-1 in decreasing temperature at 20° C./min | ° C. | 289 | 285 | 277 | 276 | 276 | 276 | 266 | 286 | 274 | 268 | 291 |
| Crystallization peak temperature Tpc-2 in decreasing temperature at 50° C./min | ° C. | 279 | 278 | 271 | 267 | 267 | 267 | 253 | 283 | 261 | 249 | 275 |
| Difference between Tpc-1 and Tpc-2 | ° C. | 10 | 7 | 6 | 9 | 9 | 9 | 13 | 3 | 13 | 19 | 16 |
| Crystallization enthalpy in decreasing temperature at 20° C./min | J/g | 27 | 38 | 35 | 36 | 36 | 36 | 34 | 23 | 33 | 29 | 28 |
| Glass transition temperature Tg | ° C. | 114 | 117 | 119 | 121 | 121 | 121 | 122 | 125 | 119 | 110 | 109 |
| Difference between Tpc-1 and Tg | ° C. | 175 | 168 | 158 | 155 | 155 | 155 | 144 | 161 | 155 | 158 | 182 |
| Sulfuric acid relative viscosity ηr at 25° C. |  | 2.2 | 2.2 | 2.2 | 2.2 | 2.1 | 2 | 2.2 | 2.2 | 1.8 | 2.2 | 2.2 |
| [NH2]/([NH2] + [COOH]) |  | 0.63 | 0.67 | 0.65 | 0.63 | 0.33 | 0.86 | 0.66 | 0.61 | 0.59 | 0.71 | 0.67 |
| Carbon atom number/amide group number |  | 8.8 | 8.6 | 8.4 | 8.3 | 8.3 | 8.3 | 8.2 | 8.0 | 8.5 | 9.4 | 9.8 |
| Biomass plastic ratio | % | 51 | 46 | 41 | 38 | 38 | 38 | 36 | 30 | 44 | 0 | 11 |
| Properties of copolymer polyamide | Tensile strength at 23° C. MPa | 88 | 92 | 95 | 95 | 93 | 97 | 95 | 90 | 82 | 81 | 79 |
|  | Tensile strength at 120° C. MPa | 53 | 59 | 62 | 62 | 60 | 63 | 62 | 50 | 42 | 45 | 42 |
|  | Water absorbance % | 2.3 | 2.5 | 2.6 | 2.6 | 2.6 | 2.6 | 2.6 | 3.8 | 2.5 | 2.3 | 2.0 |
|  | Blocking properties % | 0 | 0 | 0 | 0 | 0 | 0 | 5 | 10 | 0 | 3 | 3 |
|  | Releasability sec | 3 | 3 | 3 | 3 | 3 | 3 | 5 | 8 | 3 | 5 | 5 |
|  | Plasticizing time stability | 0.22 | 0.21 | 0.21 | 0.25 | 0.23 | 0.21 | 0.19 | 0.22 | 0.24 | 0.21 | 0.19 |

TABLE 7

|  |  | Example 21 | Example 22 | Example 23 | Example 24 | Example 25 | Example 26 |
|---|---|---|---|---|---|---|---|
| Trans isomer ratio | mol % | 70 | 70 | 70 | 71 | 70 | 70 |
| Peak melting temperature Tpm-1 | ° C. | 328 | 301 | 311 | 323 | 314 | 289 |
| Peak melting temperature Tpm-2 | ° C. | 303 | 271 | 278 | 300 | 295 | 270 |
| Difference between Tpm and Tpm-1 | ° C. | 5 | 6 | 3 | 5 | 4 | 5 |
| Difference between Tpm-1 and Tpm-2 | ° C. | 25 | 30 | 33 | 23 | 19 | 19 |
| Crystallization peak temperature Tpc-1 in decreasing temperature at 20° C./min | ° C. | 291 | 267 | 279 | 299 | 281 | 277 |
| Crystallization peak temperature Tpc-2 in decreasing temperature at 50° C./min | ° C. | 283 | 257 | 264 | 290 | 271 | 262 |
| Difference between Tpc-1 and Tpc-2 | ° C. | 8 | 10 | 15 | 9 | 10 | 15 |

TABLE 7-continued

|  |  | Example 21 | Example 22 | Example 23 | Example 24 | Example 25 | Example 26 |
|---|---|---|---|---|---|---|---|
| Crystallization enthalpy in decreasing temperature at 20° C./min | J/g | 33 | 27 | 30 | 33 | 31 | 31 |
| Glass transition temperature Tg | ° C. | 108 | 104 | 105 | 111 | 115 | 115 |
| Difference between Tpc-1 and Tg | ° C. | 183 | 163 | 174 | 188 | 166 | 162 |
| Sulfuric acid relative viscosity ηr at 25° C. |  | 2.2 | 2.2 | 2.2 | 2.2 | 2.2 | 2.2 |
| [NH2]/([NH2] + [COOH]) |  | 0.64 | 0.70 | 0.70 | 0.58 | 0.61 | 0.76 |
| Carbon atom number/amide group number |  | 8.7 | 9.3 | 9.5 | 8.6 | 8.5 | 8.5 |
| Biomass plastic ratio | % | 50 | 56 | 44 | 0 | 43 | 43 |
| Properties of copolymer polyamide | Tensile strength at 23° C. | MPa | 91 | 90 | 88 | 93 | 87 | 89 |
|  | Tensile strength at 120° C. | MPa | 45 | 52 | 51 | 53 | 56 | 57 |
|  | Water absorbance | % | 2.9 | 2.3 | 2.2 | 2.7 | 2.9 | 2.9 |
|  | Blocking properties | % | 0 | 0 | 3 | 0 | 0 | 0 |
|  | Releasability | sec | 3 | 3 | 5 | 3 | 3 | 3 |
|  | Plasticizing time stability |  | 0.20 | 0.23 | 0.22 | 0.19 | 0.21 | 0.21 |

TABLE 8

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Trans isomer ratio | mol % | 70 | 70 | 70 | 71 | 70 | 70 | 70 | 81 | 82 |
| Peak melting temperature Tpm-1 | ° C. | 311 | 334 | 308 | 287 | 302 | 315 | 280 | 333 | 313 |
| Peak melting temperature Tpm-2 | ° C. | 274 | 300 | 271 | 255 | 267 | 288 | 254 | 306 | 273 |
| Difference between Tpm and Tpm-1 | ° C. | 6 | 6 | 5 | 4 | 3 | 3 | 5 | 39 | 41 |
| Difference between Tpm-1 and Tpm-2 | ° C. | 37 | 34 | 37 | 32 | 35 | 27 | 26 | 27 | 40 |
| Crystallization peak temperature Tpc-1 in decreasing temperature at 20° C./min | ° C. | 273 | 295 | 268 | 247 | 262 | 270 | 235 | 285 | 268 |
| Crystallization peak temperature Tpc-2 in decreasing temperature at 50° C./min | ° C. | 255 | 282 | 249 | 233 | 241 | 261 | 221 | 278 | 249 |
| Difference between Tpc-1 and Tpc-2 | ° C. | 18 | 13 | 19 | 14 | 21 | 9 | 14 | 7 | 19 |
| Crystallization enthalpy in decreasing temperature at 20° C./min | J/g | 28 | 35 | 29 | 19 | 15 | 45 | 21 | 40 | 31 |
| Glass transition temperature Tg | ° C. | 94 | 111 | 105 | 119 | 125 | 118 | 99 | 117 | 108 |
| Difference between Tpc-1 and Tg | ° C. | 179 | 184 | 163 | 128 | 137 | 152 | 136 | 168 | 160 |
| Sulfuric acid relative viscosity ηr at 25° C. |  | 2.2 | 2.0 | 2.2 | 2.2 | 2.2 | 2.2 | 2.2 | 1.8 | 2.0 |
| [NH2]/([NH2] + [COOH]) |  | 0.60 | 0.58 | 0.65 | 0.66 | 0.62 | 0.57 | 0.71 | 0.38 | 0.25 |
| Carbon atom number/amide group number |  | 8.5 | 9.0 | 9.5 | 9.0 | 8.8 | 7.6 | 9.0 | 8.6 | 9.4 |
| Biomass plastic ratio | % | 0 | 55 | 0 | 0 | 0 | 0 | 0 | 46 | 0 |
| Properties of copolymer polyamide | Tensile strength at 23° C. | MPa | 80 | 85 | 80 | 88 | 91 | 98 | 81 | 83 | 85 |
|  | Tensile strength at 120° C. | MPa | 31 | 50 | 33 | 48 | 40 | 45 | 39 | 35 | 45 |
|  | Water absorbance | % | 2.4 | 2.3 | 2.2 | 2.4 | 2.2 | 5.0 | 2.4 | 2.5 | 2.3 |
|  | Blocking properties | % | 5 | 5 | 5 | 12 | 12 | 0 | 12 | 0 | 3 |
|  | Releasability | sec | 7 | 7 | 7 | 9 | 9 | 3 | 9 | 3 | 5 |
|  | Plasticizing time stability |  | 0.22 | 0.19 | 0.20 | 0.24 | 0.19 | 0.22 | 0.20 | 0.42 | 0.46 |

From the results shown in Tables 5 to 8, it was confirmed that a copolymer polyamide obtained by polymerizing at least one alicyclic dicarboxylic acid, at least one diamine having 8 or more carbon atoms and at least one copolymer component as in Examples 1 to 26 has excellent strength, high-temperature strength, low water absorbance and plasticizing time stability and also has excellent low blocking properties and releasability.

Examples 27 to 52 and Comparative Examples 10 to 12

As raw materials for copolymer polyamide compositions, the following copolymer polyamides and the aforementioned inorganic filler were used.

[Copolymer Polyamides]

Each of the copolymer polyamides obtained in Examples 1 to 26 and Comparative Examples 2, 8 and 9 was dried under a nitrogen flow for adjusting the moisture content to about 0.2 mass %, so as to be used as a raw material for a polyamide composition.

[Production of Copolymer Polyamide Composition and Properties Evaluation]

A copolymer polyamide composition was produced by using a double-screw extruder (TEM 35, manufactured by Toshiba Machine Co., Ltd., L/D=47.6 (D=37 mmφ), set temperature $T_{pm-1}+20°$ C. (in a case using the copolymer polyamide obtained in Example 1, 300+20=320° C.), screw revolution speed 300 rpm) as follows. The copolymer polyamide (100 parts by mass) with the moisture content adjusted as described above was fed from a top feed opening provided at the uppermost upstream portion of the double-screw extruder. Glass fiber, used as an inorganic filler, in a ratio (parts by mass) shown in Tables 9 to 11 was fed from a side feed opening provided on a downstream side of the double-screw extruder (in which the resin fed from the top feed opening was in a sufficiently molten state). A melt kneaded product extruded from a die head was cooled in a strand form, which was pelletized to form pellets of the copolymer polyamide composition.

The respective properties of the obtained pellets of the copolymer polyamide composition were measured in accordance with the methods described in the items (14), (15) and (16) above. The measurement results are shown in Tables 9 to 11.

Incidentally, the tensile test was carried out at a tension speed of 5 ram/min.

TABLE 9

|  |  |  | Example 27 | Example 28 | Example 29 | Example 30 | Example 31 | Example 32 | Example 33 | Example 34 | Example 35 |
|---|---|---|---|---|---|---|---|---|---|---|---|
| Constituent components of copolymer polyamide composition | (A) Copolymer polyamide | Type | Example 1 | Example 2 | Example 3 | Example 4 | Example 5 | Example 6 | Example 7 | Example 8 | Example 9 |
|  |  | Parts by mass | 100 | 100 | 100 | 100 | 100 | 100 | 100 | 100 | 100 |
|  | (B) Inorganic filler | Type | GF | GF | GF | GF | GF | GF | GF | GF | GF |
|  |  | Parts by mass based on 100 parts by mass of (A) | 100 | 100 | 100 | 100 | 100 | 100 | 100 | 100 | 100 |
| Properties of copolymer polyamide composition | Vibration fatigue characteristics | MPa | 45 | 48 | 49 | 51 | 54 | 49 | 50 | 47 | 54 |
|  | Surface appearance (value of gloss at 60°) |  | 80 | 82 | 78 | 79 | 80 | 79 | 81 | 81 | 83 |
|  | Continuous productivity (the number of foreign particles due to die-lip buildup) | /5 kg | 4 | 4 | 5 | 2 | 3 | 4 | 2 | 5 | 5 |

TABLE 10

|  |  |  | Example 36 | Example 37 | Example 38 | Example 39 | Example 40 | Example 41 | Example 42 | Example 43 | Example 44 | Example 45 | Example 46 |
|---|---|---|---|---|---|---|---|---|---|---|---|---|---|
| Constituent components of copolymer polyamide composition | (A) Copolymer polyamide | Type | Example 10 | Example 11 | Example 12 | Example 13 | Example 14 | Example 15 | Example 16 | Example 17 | Example 18 | Example 19 | Example 20 |
|  |  | Parts by mass | 100 | 100 | 100 | 100 | 100 | 100 | 100 | 100 | 100 | 100 | 100 |
|  | (B) Inorganic filler | Type | GF | GF | GF | GF | GF | GF | GF | GF | GF | GF | GF |
|  |  | Parts by mass based on 100 parts by mass of (A) | 100 | 100 | 100 | 100 | 100 | 100 | 100 | 100 | 100 | 100 | 100 |

TABLE 10-continued

|  |  |  | Example 36 | Example 37 | Example 38 | Example 39 | Example 40 | Example 41 | Example 42 | Example 43 | Example 44 | Example 45 | Example 46 |
|---|---|---|---|---|---|---|---|---|---|---|---|---|---|
| Properties of copolymer polyamide composition | Vibration fatigue characteristics | MPa | 54 | 58 | 61 | 62 | 54 | 67 | 64 | 58 | 53 | 53 | 54 |
|  | Surface appearance (value of gloss at 60°) |  | 74 | 74 | 74 | 74 | 74 | 75 | 74 | 74 | 74 | 73 | 73 |
|  | Continuous productivity (the number of foreign particles due to die-lip buildup) | /5 kg | 3 | 2 | 4 | 4 | 3 | 5 | 4 | 3 | 3 | 6 | 6 |

TABLE 11

|  |  |  | Example 47 | Example 48 | Example 49 | Example 50 | Example 51 | Example 52 | Comparative Example 10 | Comparative Example 11 | Comparative Example 12 |
|---|---|---|---|---|---|---|---|---|---|---|---|
| Constituent components of copolymer polyamide composition | (A) Copolymer polyamide | Type | Example 21 | Example 22 | Example 23 | Example 24 | Example 25 | Example 26 | Comparative Example 2 | Comparative Example 8 | Comparative Example 9 |
|  |  | Parts by mass | 100 | 100 | 100 | 100 | 100 | 100 | 100 | 100 | 100 |
|  | (B) Inorganic filler | Type | GF | GF | GF | GF | GF | GF | GF | GF | GF |
|  |  | Parts by mass based on 100 parts by mass of (A) | 100 | 100 | 100 | 100 | 100 | 100 | 100 | 100 | 100 |
| Properties of copolymer polyamide composition | Vibration fatigue characteristics | MPa | 57 | 57 | 55 | 59 | 49 | 50 | 58 | 41 | 27 |
|  | Surface appearance (value of gloss at 60°) |  | 79 | 77 | 74 | 74 | 75 | 79 | 71 | 43 | 45 |
|  | Continuous productivity (the number of foreign particles due to die-lip buildup) | /5 kg | 4 | 4 | 5 | 5 | 4 | 2 | 31 | 25 | 35 |

From the results shown in Tables 9 to 11, it was confirmed that a copolymer polyamide composition containing the copolymer polyamide obtained in any one of Examples 1 to 26 and the glass fiber as in Examples 27 to 52 has excellent surface appearance, vibration fatigue characteristics and continuous productivity.

Examples 53 to 55

The following copolymer polyamides and the aforementioned inorganic filler, copper compound and metal halide were used as raw materials for copolymer polyamide compositions.
[Copolymer Polyamides]
Each of the copolymer polyamides obtained in Examples 5, 13 and 22 was dried under a nitrogen flow for adjusting the moisture content to about 0.2 mass %, so as to be used as a raw material for a polyamide composition.
[Production of Granules (1) Containing Copper Compound and Metal Halide]
A mixture of KI and ethylene bis-stearylamide was obtained by mixing 85.1 parts by mass of KI and 10 parts by mass of ethylene bis-stearylamide. The mixture was thoroughly mixed with 4.9 parts by mass of CuI, and the resultant product was granulated with a disk pelleter (F5-11-175, manufactured by Fuji Paudal Co., Ltd.) to obtain granules (1).

[Production of Copolymer Polyamide Composition and Properties Evaluation]

A copolymer polyamide composition was produced by using a double-screw extruder (TEM 35, manufactured by Toshiba Machine Co., Ltd., L/D=47.6 (D=37 mmϕ), set temperature $T_{pm-1}$+20° C. (in this case, 300+20=320° C.), screw revolution speed 300 rpm) as follows. The copolymer polyamide (100 parts by mass) with the moisture content adjusted as described above and the granules (1) (6.1 parts by mass) obtained as described above were fed from a top feed opening provided at the uppermost upstream portion of the double-screw extruder. Glass fiber, used as an inorganic filler, in a ratio (parts by mass) shown in Table 12 was fed from a side feed opening provided on a downstream side of the double-screw extruder (in which the resin fed from the top feed opening was in a sufficiently molten state). A melt kneaded product extruded from a die head was cooled in a strand form, which was pelletized to form pellets of the copolymer polyamide composition.

The respective properties of the obtained pellets of the copolymer polyamide composition were measured in accordance with the methods described in the items (17), (18) and (19) above. The measurement results are shown in Table 12.

Incidentally, the tensile test was carried out at a tension speed of 5 mm/min.

TABLE 12

|  |  |  | Example 53 | Example 54 | Example 55 |
|---|---|---|---|---|---|
| Constituent components of copolymer polyamide composition | (A) Copolymer polyamide | Type | Example 5 | Example 13 | Example 22 |
|  |  | Parts by mass | 100 | 100 | 100 |
|  | (B) Inorganic filler | Type | GF | GF | GF |
|  |  | Parts by mass based on 100 parts by mass of (A) | 100 | 100 | 100 |
|  | Copper compound | Type | CuI | CuI | CuI |
|  |  | Parts by mass based on 100 parts by mass of (A) | 0.30 | 0.30 | 0.30 |
|  | Metal halide compound | Type | KI | KI | KI |
|  |  | Parts by mass based on 100 parts by mass of (A) | 5.2 | 5.2 | 5.2 |
|  | Copper | Parts by mass based on $10^6$ parts by mass of (A) | 1000 | 1000 | 1000 |
|  | Halogen/copper | Molar ratio | 20 | 20 | 20 |
| Properties of copolymer polyamide composition | Strength half-life | Days | 49 | 51 | 47 |
|  | Tensile strength retention rate after dipping | % | 97 | 93 | 95 |

The present application is based on a Japanese patent application filed on Jan. 7, 2011 (Japanese Patent Application No. 2011-002061), whose contents are hereby incorporated by reference herein.

INDUSTRIAL APPLICABILITY

According to the present invention, a copolymer polyamide which has excellent strength, high-temperature strength, low water absorbance, low blocking properties and releasability and is reduced in the environmental load, and a copolymer polyamide composition which has excellent vibration fatigue characteristics, surface appearance and continuous productivity can be obtained. The copolymer polyamide and the copolymer polyamide composition according to the present invention have industrial applicability, and can be suitably used as, for example, a molding material for various parts, such as in automobiles, electric and electronics, industrial materials, and daily and household articles.

The invention claimed is:

1. A copolymer polyamide obtained by melt polymerizing at a temperature of 250° C. to 350° C.:
    (a) at least one alicyclic dicarboxylic acid;
    (b) one diamine having 8 or more carbon atoms; and
    (c) at least one copolymer component selected from the group consisting of the following (c-1) to (c-3):
        a (c-1) dicarboxylic acid other than the alicyclic dicarboxylic acid;
        a (c-2) diamine having fewer carbon atoms than the (b) diamine; and
        a (c-3) lactam and/or aminocarboxylic acid, and
    the copolymer polyamide having a trans isomer ratio of a portion derived from the (a) alicyclic dicarboxylic acid in the copolymer polyamide of 70 to 80 mol %, and satisfying the following conditions (1) to (3):
    (1) in differential scanning calorimetry based on JIS-K7121, a difference ($T_{pc-1}$ -$T_g$) between a crystallization peak temperature $T_{pc-1}$ obtained in decreasing a temperature at 20° C./min and a glass transition temperature $T_g$ is 140° C. or more;
    (2) a ratio between the number of carbon atoms and the number of amide groups (carbon atom number/amide group number) is 8 or more; and
    (3) in differential scanning calorimetry based on JIS-K7121, a difference ($T_{pm}$ -$T_{pm-1}$) between a peak melting temperature $T_{pm}$ obtained in increasing a temperature at 20° C./min and a peak melting temperature $T_{pm-1}$ obtained in increasing the temperature again at 20° C./min is 30° C. or less.

2. The copolymer polyamide according to claim 1, wherein the (a) alicyclic dicarboxylic acid is 1,4-cyclohexanedicarboxylic acid.

3. The copolymer polyamide according to claim 1, wherein a ratio of an amount of amino terminals to a total amount of amino terminals and carboxyl terminals {the amount of amino terminals/(the amount of amino terminals +the amount of carboxyl terminals) } is 0.5 or more and less than 1.0.

4. The copolymer polyamide according to claim 1, wherein the (b) one diamine having 8 or more carbon atoms is decamethylenediamine.

5. The copolymer polyamide according to claim 1, comprising a (c-1) dicarboxylic acid other than the alicyclic dicarboxylic acid, which is an aliphatic dicarboxylic acid having 10 or more carbon atoms.

6. The copolymer polyamide according to claim 1, comprising a (c-1) dicarboxylic acid other than the alicyclic dicarboxylic acid, which is sebacic acid and/or dodecanedioic acid.

7. The copolymer polyamide according to claim 1, comprising a (c-1) dicarboxylic acid other than the alicyclic dicarboxylic acid, which is isophthalic acid.

8. The copolymer polyamide according to claim 1, comprising a (c-2) diamine having fewer carbon atoms than the (b) diamine, which is an aliphatic diamine having 4 to 7 carbon atoms.

9. The copolymer polyamide according to claim 1, wherein in differential scanning calorimetry based on JIS-K7121, a difference ($T_{pc-1}$ -$T_{pc-2}$) between a crystallization peak temperature $T_{pc-1}$ obtained in decreasing a temperature at 20° C./min and a crystallization peak temperature $T_{pc-2}$ obtained in decreasing the temperature again at 50° C./min is 10° C. or less.

10. The copolymer polyamide according to claim 1, wherein a blend amount of the (c) copolymer component is 7.5 mol % or more and 20.0 mol % or less based on 100 mol % of all constituent components of the copolymer polyamide.

11. The copolymer polyamide according to claim 1, wherein the copolymer polyamide has a biomass plastic ratio of 25% or more.

12. A copolymer polyamide composition comprising:
the copolymer polyamide according to claim 1; and
at least one component selected from the group consisting of an inorganic filler, a nucleating agent, a lubricant, a stabilizer and a polymer other than the copolymer polyamide.

13. A molded product comprising the copolymer polyamide according to claim 1.

14. The molded product according to claim 13, wherein the molded product is used as an automobile component, an electronic component, a household electrical appliance component, an OA equipment component or a mobile equipment component.

15. A method for producing the copolymer polyamide according to claim 1, comprising a step of melt polymerizing at a temperature of 250° C. to 350° C.:
(a) at least one alicyclic dicarboxylic acid;
(b) one diamine having 8 or more carbon atoms; and
(c) at least one copolymer component selected from the group consisting of the following (c-1) to (c-3):
    a (c-1) dicarboxylic acid other than the alicyclic dicarboxylic acid;
    a (c-2) diamine having fewer carbon atoms than the (b) diamine; and
    a (c-3) lactam and/or aminocarboxylic acid,
wherein a trans isomer ratio of a portion derived from the (a) alicyclic dicarboxylic acid in the copolymer polyamide obtained in the melt polymerizing step is maintained at 70 to 80%.

16. A method for producing a copolymer polyamide composition comprising a step of melt kneading, with an extruder, raw material components including the copolymer polyamide according to claim 1,
wherein a set temperature of the extruder is set to the peak melting temperature $T_{pm-1}$ +30° C. or less.

17. The copolymer polyamide according to claim 2, wherein a ratio of an amount of amino terminals to a total amount of amino terminals and carboxyl terminals {the amount of amino terminals/(the amount of amino terminals + the amount of carboxyl terminals)} is 0.5 or more and less than 1.0.

18. The copolymer polyamide according to claim 2, wherein the (b) one diamine having 8 or more carbon atoms is decamethylenediamine.

19. The copolymer polyamide according to claim 2, comprising a (c-1) dicarboxylic acid other than the alicyclic dicarboxylic acid, which is an aliphatic dicarboxylic acid having 10 or more carbon atoms.

20. The copolymer polyamide according to claim 2, comprising a (c-1) dicarboxylic acid other than the alicyclic dicarboxylic acid, which is sebacic acid and/or dodecanedioic acid.

21. The copolymer polyamide according to claim 2, comprising a (c-1) dicarboxylic acid other than the alicyclic dicarboxylic acid, which is isophthalic acid.

22. The copolymer polyamide according to claim 2, comprising a (c-2) diamine having fewer carbon atoms than the (b) diamine, which is an aliphatic diamine having 4 to 7 carbon atoms.

23. The copolymer polyamide according to claim 2, wherein in differential scanning calorimetry based on JIS-K7121, a difference ($T_{pc-1}$-$T_{pc-2}$) between a crystallization peak temperature $T_{pc-1}$ obtained in decreasing a temperature at 20° C./min and a crystallization peak temperature $T_{pc-2}$ obtained in decreasing the temperature again at 50° C./min is 10° C. or less.

24. The copolymer polyamide according to claim 2, wherein a blend amount of the (c) copolymer component is 7.5 mol % or more and 20.0 mol % or less based on 100 mol % of all constituent components of the copolymer polyamide.

25. The copolymer polyamide according to claim 2, wherein the copolymer polyamide has a biomass plastic ratio of 25% or more.

26. A molded product comprising the copolymer polyamide according to claim 12.

27. The molded product according to claim 26, wherein the molded product is used as an automobile component, an electronic component, a household electrical appliance component, an OA equipment component or a mobile equipment component.

28. A method for producing the copolymer polyamide according to claim 2, comprising a step of melt polymerizing at a temperature of 250° C. to 350° C.:
(a) at least one alicyclic dicarboxylic acid;
(b) one diamine having 8 or more carbon atoms; and
(c) at least one copolymer component selected from the group consisting of the following (c-1) to (c-3):
    a (c-1) dicarboxylic acid other than the alicyclic dicarboxylic acid;
    a (c-2) diamine having fewer carbon atoms than the (b) diamine; and
    a (c-3) lactam and/or aminocarboxylic acid,
wherein a trans isomer ratio of a portion derived from the (a) alicyclic dicarboxylic acid in the copolymer polyamide obtained in the melt polymerizing step is maintained at 70 to 80%.

29. A method for producing a copolymer polyamide composition comprising a step of melt kneading, with an extruder, raw material components including the copolymer polyamide according to claim 2,
wherein a set temperature of the extruder is set to the peak melting temperature $T_{pm-1}$ +30° C. or less.

* * * * *

UNITED STATES PATENT AND TRADEMARK OFFICE
CERTIFICATE OF CORRECTION

PATENT NO. : 9,611,356 B2  
APPLICATION NO. : 13/990937  
DATED : April 4, 2017  
INVENTOR(S) : S. Ieda et al.

Page 1 of 1

It is certified that error appears in the above-identified patent and that said Letters Patent is hereby corrected as shown below:

In the Claims

Column 54, Line 31 Claim 3, change "+the" to -- + the --
Column 54, Line 57 Claim 9, change "$_2$obtained" to -- $_2$ obtained --
Column 55, Line 40 Claim 17, change "+the" to -- + the --
Column 56, Line 13 Claim 23, change "$_2$obtained" to -- $_2$ obtained --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*